United States Patent
Takase et al.

(10) Patent No.: US 10,521,510 B2
(45) Date of Patent: Dec. 31, 2019

(54) COMPUTER-READABLE RECORDING MEDIUM, RETRIEVAL DEVICE, AND RETRIEVAL METHOD

(71) Applicant: FUJITSU LIMITED, Kawasaki-shi, Kanagawa (JP)

(72) Inventors: Nobuko Takase, Mizuho (JP); Kazuo Mineno, Inagi (JP); Naohiro Itou, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 15/692,842

(22) Filed: Aug. 31, 2017

(65) Prior Publication Data
US 2018/0075017 A1 Mar. 15, 2018

(30) Foreign Application Priority Data
Sep. 15, 2016 (JP) .................. 2016-181003

(51) Int. Cl.
G06F 17/27 (2006.01)
G06F 16/338 (2019.01)
G06F 16/33 (2019.01)
G06F 17/21 (2006.01)

(52) U.S. Cl.
CPC ........ *G06F 17/2785* (2013.01); *G06F 16/338* (2019.01); *G06F 16/3344* (2019.01); *G06F 17/2735* (2013.01); *G06F 17/2755* (2013.01); *G06F 17/2795* (2013.01)

(58) Field of Classification Search
CPC .......... G06F 17/2785; G06F 17/30684; G06F 17/2795; G06F 17/30696; G06F 17/2755; G06F 17/2735
USPC ........................ 704/2, 5, 7, 9, 231, 251, 277
See application file for complete search history.

(56) References Cited

U.S. PATENT DOCUMENTS

2015/0081715 A1* 3/2015 Okura ............... G06F 17/30616
707/739

FOREIGN PATENT DOCUMENTS

| JP | 2011-210090 | 10/2011 |
| JP | 2014-235723 | 12/2014 |
| JP | 2015-060243 | 3/2015 |

* cited by examiner

Primary Examiner — Thierry L Pham
(74) Attorney, Agent, or Firm — Fujitsu Patent Center

(57) ABSTRACT

When retrieving specific text from a search target document, an information processing apparatus receives text, generates a semantic structure indicating a meaning of a word that is included in the received text, by subjecting the received text to semantic analysis, identifies a word that is associated with the generated semantic structure, by referring to a synonym dictionary that stores a word and semantic structure indicating a meaning of the word in an associated manner, determines whether the identified word is included in the search target document, and outputs information according to a determination result.

8 Claims, 23 Drawing Sheets

FIG.3A

ORIGINAL TEXT: 運用環境のカスタマイズが必要です。
(YOU NEED TO CUSTOMIZE THE OPERATIONAL ENVIRONMENT.)

| NOTATION | PART OF SPEECH | SEMANTIC ATTRIBUTE | CONCEPT SYMBOL |
|---|---|---|---|
| 運用環境 (OPERATIONAL ENVIRONMENT) | N | N1, N2, ...... | EJRO1 |
| の | JO | J1, J2, ...... | DW |
| カスタマイズ (CUSTOMIZE) | SN | S1, S2, ...... | CUSTOMIZE |
| が | JO | J4, J5, ...... | J.GA |
| 必要 (NEED) | AN | A1, A2, ...... | NEED |
| です | PRED | P1, P2, ...... | GK3 |
| 。 | CW | C1, C2, ...... | PERIOD |

(TERM LIST)

-----
(EJR01)--<J.NO>-->(NULL)
(CUSTOMIZE)--<J.GA>-->(NULL)
(CUSTOMIZE)--<OBJ>-->(EJR01)
(NULL)--<ST>-->(NEED)
(NEED)--<PRED>-->(NULL)
(NEED)--<OBJA>-->(CUSTOMIZE)
-----

(GRAPH STRUCTURE)

運用環境の変更により、対処が可能です。
(IT IS NECESSARY TO SOLVE THE PROBLEM BY CHANGE OF THE OPERATIONAL ENVIRONMENT.)

ORIGINAL TEXT: 運用環境のカスタマイズが必要です。
(YOU NEED TO CUSTOMIZE THE OPERATIONAL ENVIRONMENT)

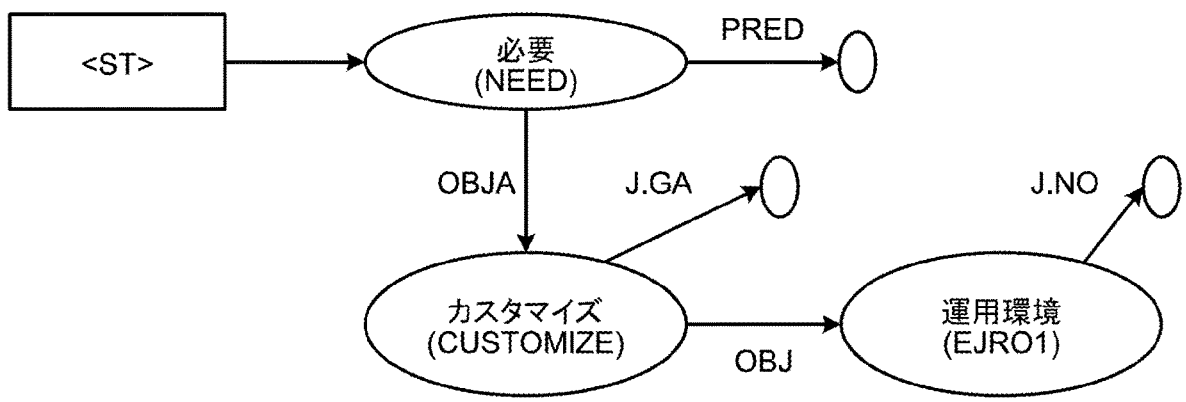

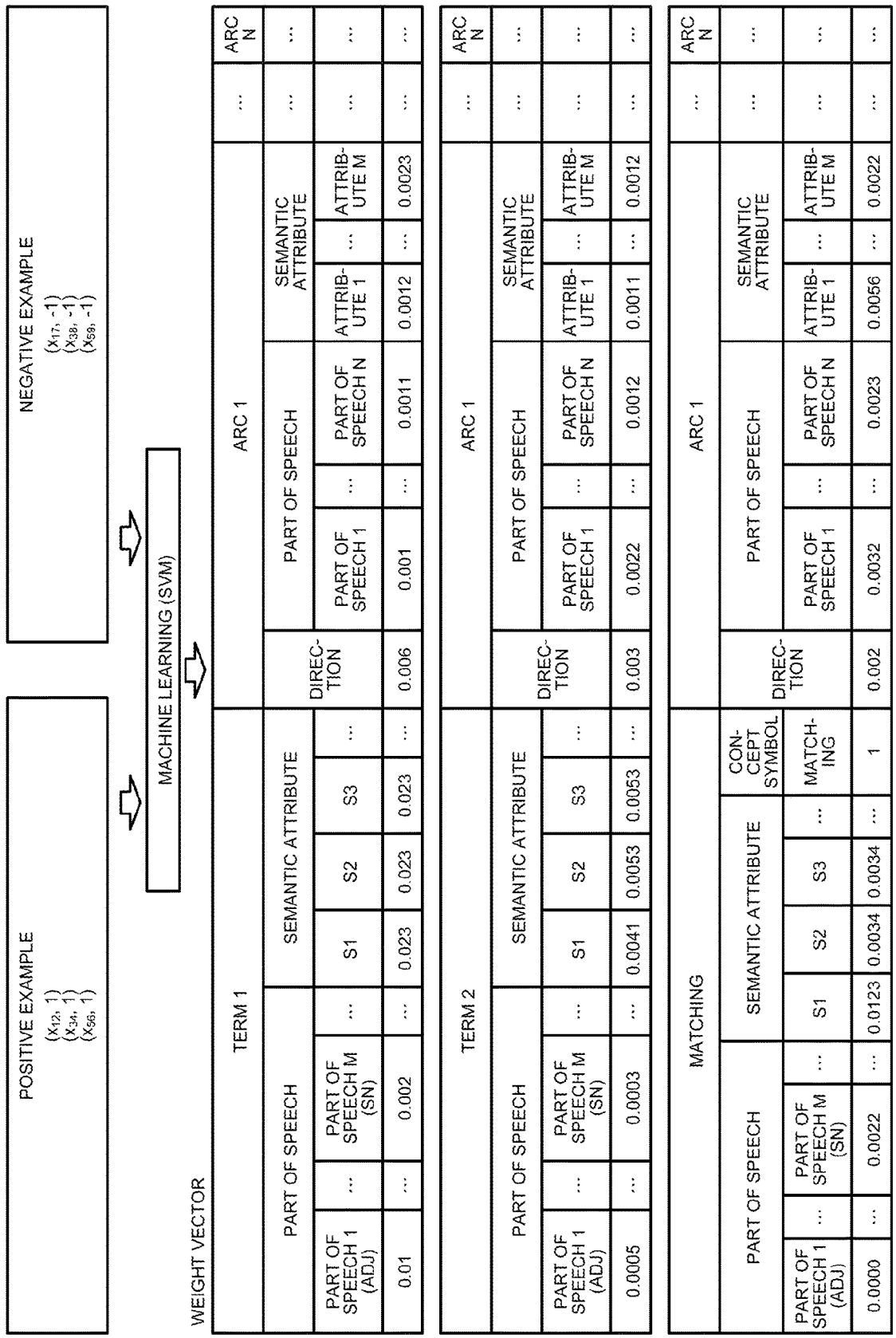

FIG.6B

| FEATURE VECTOR OF TERM x | | | | | | | | | | | | | | |
|---|---|---|---|---|---|---|---|---|---|---|---|---|---|---|
| TERM x (TERM IN SEARCH TEXT) | | | | | | ARC 1 | | | | | | ARC N | ... | |
| PART OF SPEECH | | | SEMANTIC ATTRIBUTE | | | PART OF SPEECH | | | SEMANTIC ATTRIBUTE | | | | | |
| PART OF SPEECH 1 (ADJ) | ... | PART OF SPEECH 7 (SN) | ... | PART OF SPEECH 10 | AN$N V$N | ... | N$N | PART OF SPEECH 1 | ... | PART OF SPEECH 30 | AN$N V$N | ... | N$N | ... |
| 0 | ... | 1 | ... | 0 | 1 | ... | 1 | 0 | ... | 0 | 0 | ... | 0 | ... |

FIG.6C

画像 (IMAGE)
クリア (CLEAR)
表示 (DISPLAY)

21

| FLAG | NOTATION OF TERM | SEMANTIC STRUCTURE | |
|---|---|---|---|
| TERM 1 | クリア (CLEAR) | SEMANTIC STRUCTURE 1 OF クリア (CLEAR) | |
| TERM 2 | 消去 (DELETE) | SEMANTIC STRUCTURE 1 OF 消去 (DELETE) | → "TERM y" |
| TERM 1 | クリア (CLEAR) | SEMANTIC STRUCTURE 1 OF クリア (CLEAR) | |
| TERM 2 | クリア (CLEAR) | SEMANTIC STRUCTURE 2 OF クリア (CLEAR) | → "TERM y" |
| TERM 1 | クリア (CLEAR) | SEMANTIC STRUCTURE 2 OF クリア (CLEAR) | |
| TERM 2 | クリア (CLEAR) | SEMANTIC STRUCTURE 1 OF クリア (CLEAR) | → "TERM y" |
| ⋮ | ⋮ | ⋮ | |
| TERM 1 | クリア (CLEAR) | SEMANTIC STRUCTURE 3 OF クリア (CLEAR) | |
| TERM 2 | 明確 (ACCURATE) | SEMANTIC STRUCTURE 1 OF 明確 (ACCURATE) | → "TERM y" |
| TERM 1 | 鮮明 (SHARP) | SEMANTIC STRUCTURE 1 OF 鮮明 (SHARP) | → "TERM y" |
| TERM 2 | クリア (CLEAR) | SEMANTIC STRUCTURE 3 OF クリア (CLEAR) | |

⇩

FEATURE VECTOR OF TERM y (消去 (DELETE))

| TERM y (TERM IN SYNONYM DICTIONARY) | | | | | | ARC 1 | | | | | ... | ARC N |
|---|---|---|---|---|---|---|---|---|---|---|---|---|
| PART OF SPEECH | | | SEMANTIC ATTRIBUTE | | | PART OF SPEECH | | SEMANTIC ATTRIBUTE | | | ... | ... |
| PART OF SPEECH 1 (ADJ) | ... | PART OF SPEECH 7 (SN) | PART OF SPEECH 10 | AN$N V$N | ... | N$N | ... | PART OF SPEECH 1 | ... | PART OF SPEECH 30 | AN$N V$N | ... | N$N | ... | ... |
| 1 | ... | 0 | 0 | 1 | ... | 1 | ... | 0 | ... | 0 | 0 | ... | 0 | ... |

FEATURE VECTOR OF TERM y (クリア (CLEAR))

| TERM y (TERM IN SYNONYM DICTIONARY) | | | | | | ARC 1 | | | | | ... | ARC N |
|---|---|---|---|---|---|---|---|---|---|---|---|---|
| PART OF SPEECH | | | SEMANTIC ATTRIBUTE | | | PART OF SPEECH | | SEMANTIC ATTRIBUTE | | | ... | ... |
| PART OF SPEECH 1 (ADJ) | ... | PART OF SPEECH 7 (SN) | PART OF SPEECH 10 | AN$N V$N | ... | N$N | ... | PART OF SPEECH 1 | ... | PART OF SPEECH 30 | AN$N V$N | ... | N$N | ... | ... |
| 1 | ... | 0 | 0 | 1 | ... | 1 | ... | 0 | ... | 0 | 0 | ... | 0 | ... |

FEATURE VECTOR OF TERM y (クリア (CLEAR))

| TERM y (TERM IN SYNONYM DICTIONARY) | | | | | | ARC 1 | | | | | ... | ARC N |
|---|---|---|---|---|---|---|---|---|---|---|---|---|
| PART OF SPEECH | | | SEMANTIC ATTRIBUTE | | | PART OF SPEECH | | SEMANTIC ATTRIBUTE | | | ... | ... |
| PART OF SPEECH 1 (ADJ) | ... | PART OF SPEECH 7 (SN) | PART OF SPEECH 10 | AN$N V$N | ... | N$N | ... | PART OF SPEECH 1 | ... | PART OF SPEECH 30 | AN$N V$N | ... | N$N | ... | ... |
| 1 | ... | 0 | 0 | 1 | ... | 1 | ... | 0 | ... | 0 | 0 | ... | 0 | ... |

FEATURE VECTOR OF TERM y (明確 (ACCURATE))

| TERM y (TERM IN SYNONYM DICTIONARY) | | | | | | ARC 1 | | | | | ... | ARC N |
|---|---|---|---|---|---|---|---|---|---|---|---|---|
| PART OF SPEECH | | | SEMANTIC ATTRIBUTE | | | PART OF SPEECH | | SEMANTIC ATTRIBUTE | | | ... | ... |
| PART OF SPEECH 1 (ADJ) | ... | PART OF SPEECH 7 (SN) | PART OF SPEECH 10 | AN$N V$N | ... | N$N | ... | PART OF SPEECH 1 | ... | PART OF SPEECH 30 | AN$N V$N | ... | N$N | ... | ... |
| 0 | ... | 1 | 0 | 1 | ... | 1 | ... | 0 | ... | 0 | 0 | ... | 0 | ... |

FEATURE VECTOR OF TERM y (鮮明 (SHARP))

| TERM y (TERM IN SYNONYM DICTIONARY) | | | | | | ARC 1 | | | | | ... | ARC N |
|---|---|---|---|---|---|---|---|---|---|---|---|---|
| PART OF SPEECH | | | SEMANTIC ATTRIBUTE | | | PART OF SPEECH | | SEMANTIC ATTRIBUTE | | | ... | ... |
| PART OF SPEECH 1 (ADJ) | ... | PART OF SPEECH 7 (SN) | PART OF SPEECH 10 | AN$N V$N | ... | N$N | ... | PART OF SPEECH 1 | ... | PART OF SPEECH 30 | AN$N V$N | ... | N$N | ... | ... |
| 0 | ... | 1 | 0 | 1 | ... | 1 | ... | 0 | ... | 0 | 0 | ... | 0 | ... |

FIG.6D

| FEATURE VECTOR OF COMPARISON RESULT OF TERM x-TERM y (消去 (DELETE)) |||||||||||||
|---|---|---|---|---|---|---|---|---|---|---|---|---|
| TERM y (TERM IN SYNONYM DICTIONARY) |||||| ARC 1 |||||| ... | ARC N |
| PART OF SPEECH ||| SEMANTIC ATTRIBUTE ||| PART OF SPEECH || SEMANTIC ATTRIBUTE ||| ... | ... |
| PART OF SPEECH 1 (ADJ) | ... | PART OF SPEECH 7 (SN) | PART OF SPEECH 10 | AN$N V$N | ... | N$N | PART OF SPEECH 1 | ... | PART OF SPEECH 30 | AN$N V$N | ... | N$N | ... | ... |
| 1 | ... | 0 | 0 | 1 | ... | 1 | ... | 0 | ... | 0 | 0 | ... | 0 | ... | ... |

| FEATURE VECTOR OF COMPARISON RESULT OF TERM x-TERM y (クリア (CLEAR)) |||||||||||||
|---|---|---|---|---|---|---|---|---|---|---|---|---|
| TERM y (TERM IN SYNONYM DICTIONARY) |||||| ARC 1 |||||| ... | ARC N |
| PART OF SPEECH ||| SEMANTIC ATTRIBUTE ||| PART OF SPEECH || SEMANTIC ATTRIBUTE ||| ... | ... |
| PART OF SPEECH 1 (ADJ) | ... | PART OF SPEECH 7 (SN) | PART OF SPEECH 10 | AN$N V$N | ... | N$N | PART OF SPEECH 1 | ... | PART OF SPEECH 30 | AN$N V$N | ... | N$N | ... | ... |
| 1 | ... | 0 | 0 | 1 | ... | 1 | ... | 0 | ... | 0 | 0 | ... | 0 | ... | ... |

| FEATURE VECTOR OF COMPARISON RESULT OF TERM x-TERM y (クリア (CLEAR)) |||||||||||||
|---|---|---|---|---|---|---|---|---|---|---|---|---|
| TERM y (TERM IN SYNONYM DICTIONARY) |||||| ARC 1 |||||| ... | ARC N |
| PART OF SPEECH ||| SEMANTIC ATTRIBUTE ||| PART OF SPEECH || SEMANTIC ATTRIBUTE ||| ... | ... |
| PART OF SPEECH 1 (ADJ) | ... | PART OF SPEECH 7 (SN) | PART OF SPEECH 10 | AN$N V$N | ... | N$N | PART OF SPEECH 1 | ... | PART OF SPEECH 30 | AN$N V$N | ... | N$N | ... | ... |
| 1 | ... | 0 | 0 | 1 | ... | 1 | ... | 0 | ... | 0 | 0 | ... | 0 | ... | ... |

| FEATURE VECTOR OF COMPARISON RESULT OF TERM x-TERM y (明確 (ACCURATE)) |||||||||||||
|---|---|---|---|---|---|---|---|---|---|---|---|---|
| TERM y (TERM IN SYNONYM DICTIONARY) |||||| ARC 1 |||||| ... | ARC N |
| PART OF SPEECH ||| SEMANTIC ATTRIBUTE ||| PART OF SPEECH || SEMANTIC ATTRIBUTE ||| ... | ... |
| PART OF SPEECH 1 (ADJ) | ... | PART OF SPEECH 7 (SN) | PART OF SPEECH 10 | AN$N V$N | ... | N$N | PART OF SPEECH 1 | ... | PART OF SPEECH 30 | AN$N V$N | ... | N$N | ... | ... |
| 0 | ... | 1 | 0 | 1 | ... | 1 | ... | 0 | ... | 0 | 0 | ... | 0 | ... | ... |

| FEATURE VECTOR OF COMPARISON RESULT OF TERM x-TERM y (鮮明 (SHARP)) |||||||||||||
|---|---|---|---|---|---|---|---|---|---|---|---|---|
| TERM y (TERM IN SYNONYM DICTIONARY) |||||| ARC 1 |||||| ... | ARC N |
| PART OF SPEECH ||| SEMANTIC ATTRIBUTE ||| PART OF SPEECH || SEMANTIC ATTRIBUTE ||| ... | ... |
| PART OF SPEECH 1 (ADJ) | ... | PART OF SPEECH 7 (SN) | PART OF SPEECH 10 | AN$N V$N | ... | N$N | PART OF SPEECH 1 | ... | PART OF SPEECH 30 | AN$N V$N | ... | N$N | ... | ... |
| 0 | ... | 1 | 0 | 1 | ... | 1 | ... | 0 | ... | 0 | 0 | ... | 0 | ... | ... |

FIG.6E

| FEATURE VECTOR OF TERM x (TERM IN SEARCH TEXT) | FEATURE VECTOR OF TERM y (TERM IN SYNONYM DICTIONARY) | FEATURE VECTOR OF COMPARISON RESULT | |
|---|---|---|---|
| クリア (CLEAR) | 消去 (DELETE) | COMPARISON OF クリア (CLEAR)- 消去 (DELETE) | 〜24 |
| クリア (CLEAR) | クリア (CLEAR) | COMPARISON OF クリア (CLEAR)- クリア (CLEAR) | 〜24 |
| クリア (CLEAR) | クリア (CLEAR) | COMPARISON OF クリア (CLEAR)- クリア (CLEAR) | 〜24 |
| クリア (CLEAR) | 明確 (ACCURATE) | COMPARISON OF クリア (CLEAR)- 明確 (ACCURATE) | 〜24 |
| クリア (CLEAR) | 鮮明 (SHARP) | COMPARISON OF クリア (CLEAR)- 鮮明 (SHARP) | 〜24 |

FIG.6F

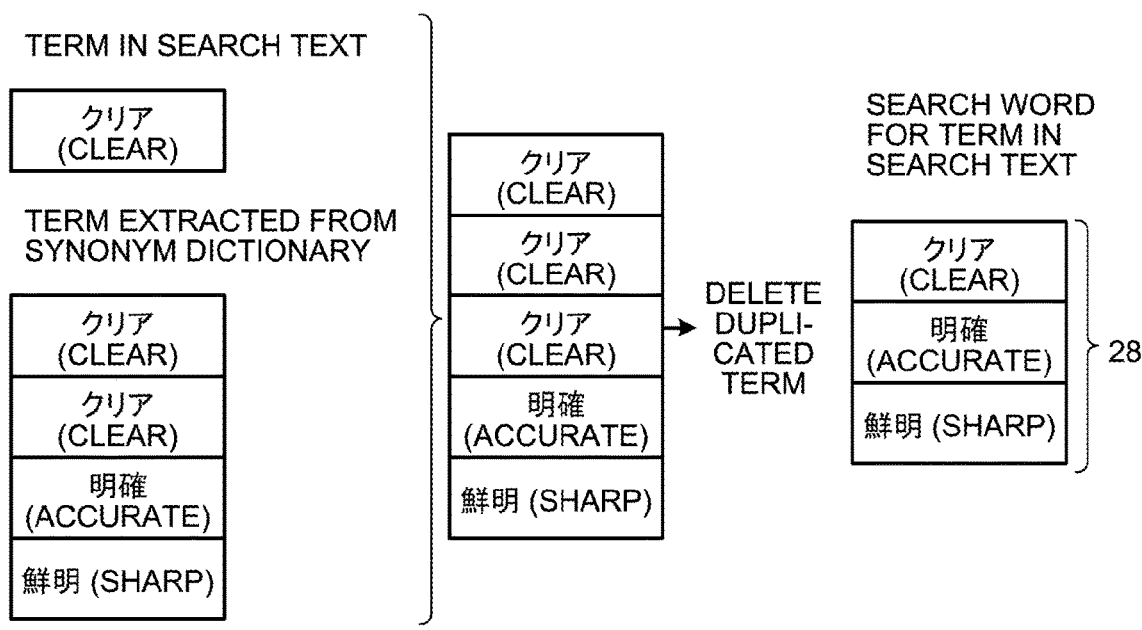

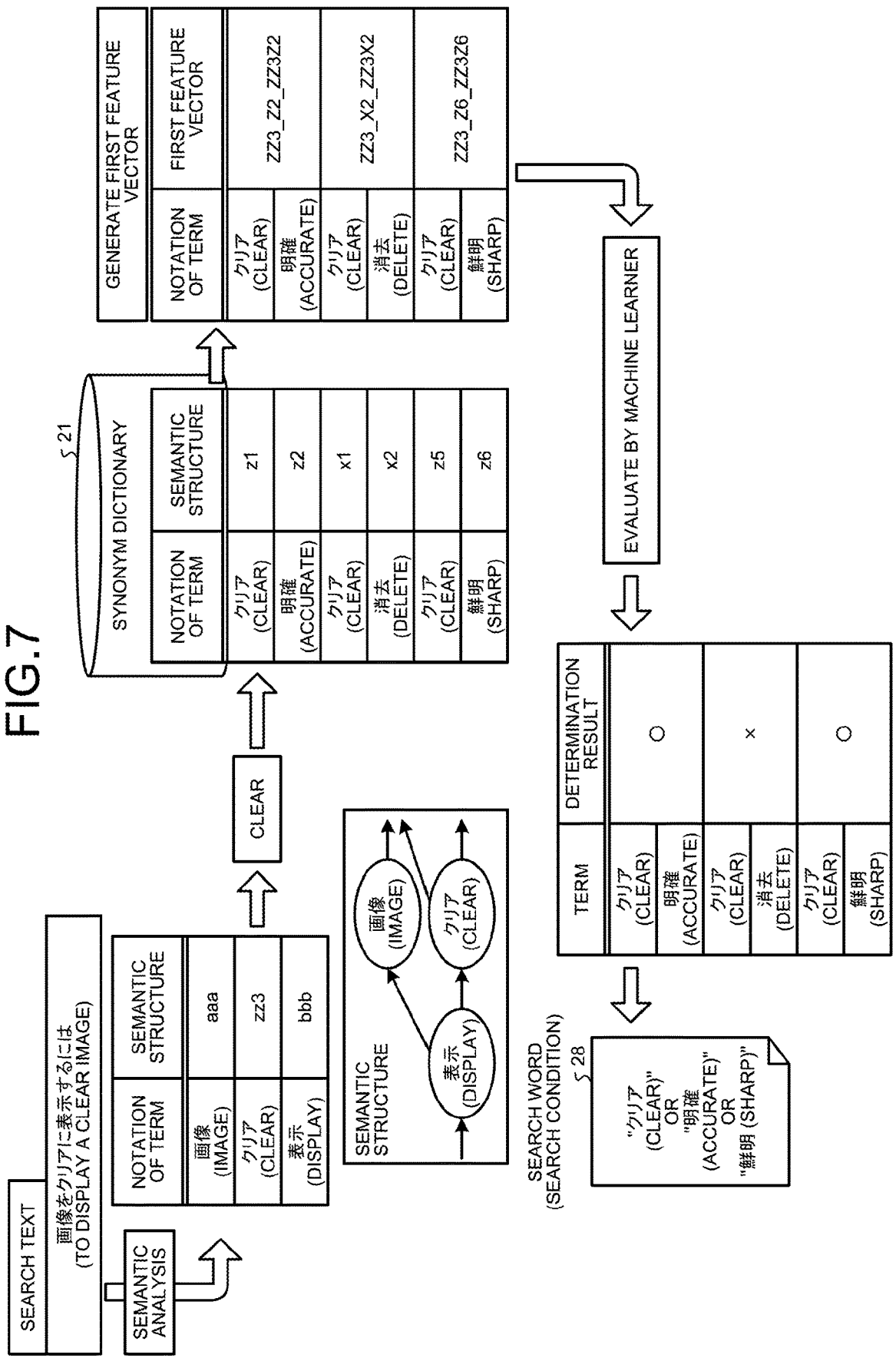

FIG.8A

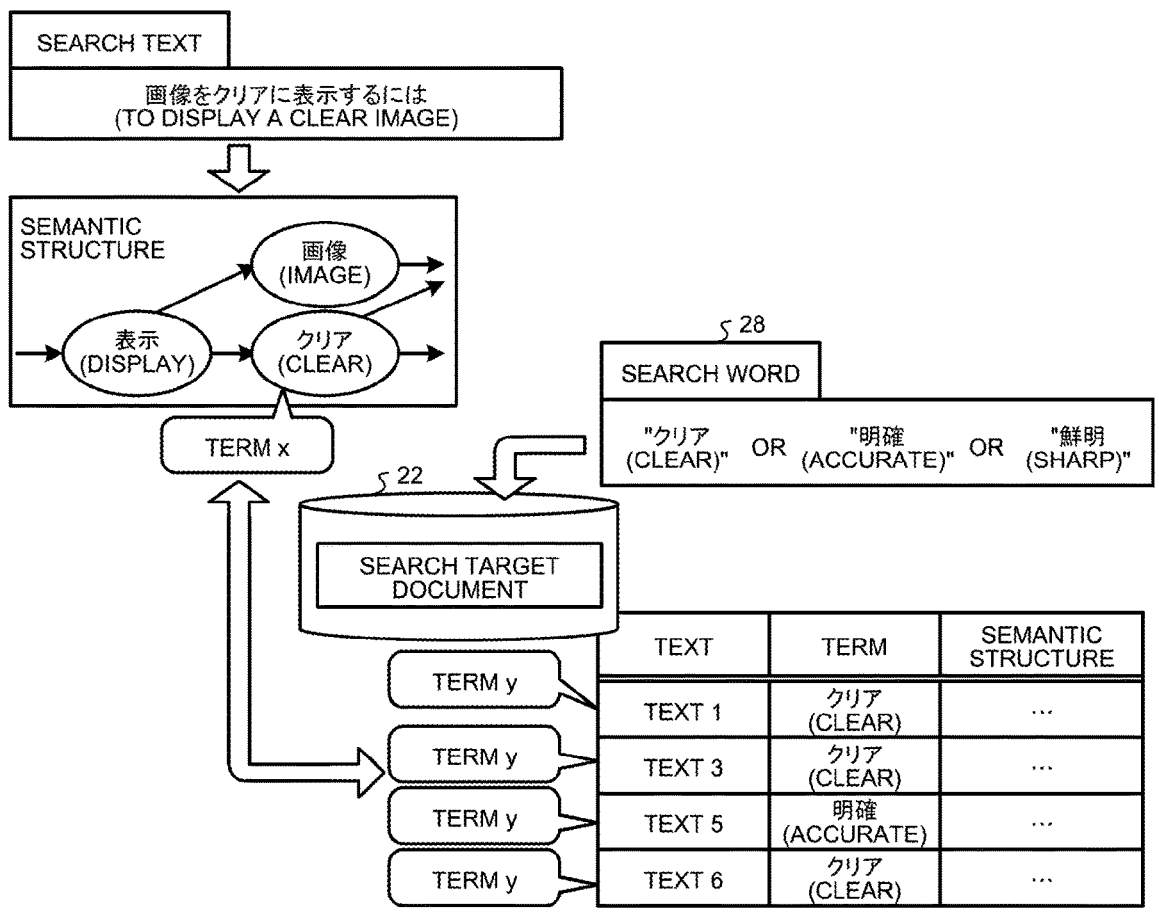

FIG.8B

| FEATURE VECTOR OF TERM x (TERM IN SEARCH TEXT) | FEATURE VECTOR OF TERM y (TERM MATCHING IN NOTATION WITH SEARCH WORD RETRIEVED FROM SEARCH TARGET DOCUMENT) | FEATURE VECTOR OF COMPARISON RESULT | |
|---|---|---|---|
| クリア (CLEAR) | クリア (CLEAR) IN TEXT 1 | COMPARISON OF クリア (CLEAR)-クリア (CLEAR) IN TEXT 1 | 25 |
| クリア (CLEAR) | クリア (CLEAR) IN TEXT 3 | COMPARISON OF クリア (CLEAR)-クリア (CLEAR) IN TEXT 3 | 25 |
| クリア (CLEAR) | 明確 (ACCURATE) IN TEXT 5 | COMPARISON OF クリア (CLEAR)-明確 (ACCURATE) IN TEXT 5 | 25 |
| クリア (CLEAR) | クリア (CLEAR) IN TEXT 6 | COMPARISON OF クリア (CLEAR)-クリア (CLEAR) IN TEXT 6 | 25 |

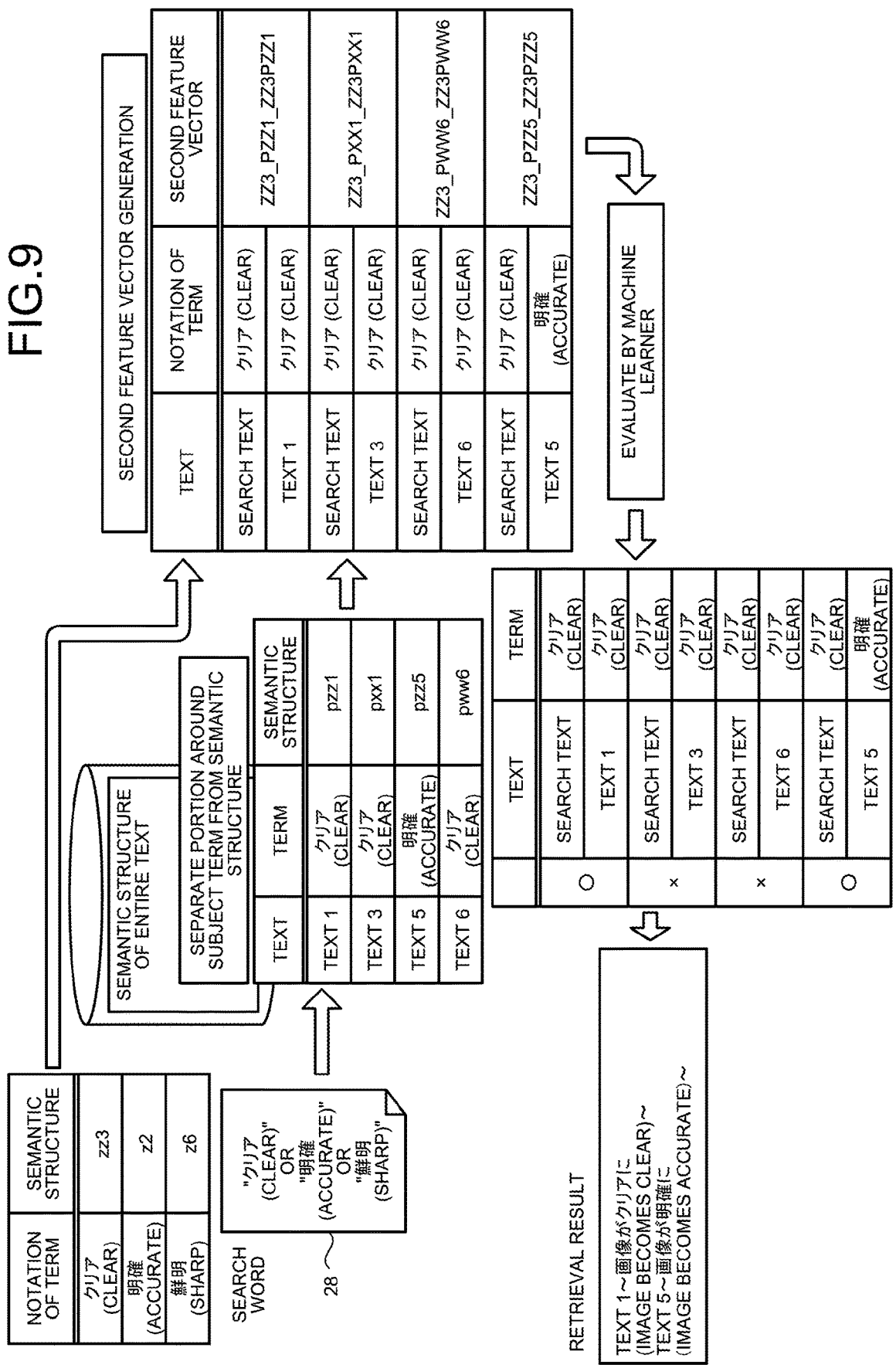

FIG.11

| FLAG | NOTATION OF TERM 1 | LINE NUMBER OF SEMANTIC STRUCTURE OF TEXT INCLUDING TERM 1 | NOTATION OF TERM 2 | LINE NUMBER OF SEMANTIC STRUCTURE OF TEXT INCLUDING TERM 2 |
|---|---|---|---|---|
| True | ONLY ONE | 249582 | UNIQUE | 777752 |
| False | CLEAR | 1106786 | CLEAR | 35216 |
| True | MATERIAL | 1402 | CONTENT | 33110 |
| True | LETTER | 150 | WORD | 1075 |

US 10,521,510 B2

COMPUTER-READABLE RECORDING MEDIUM, RETRIEVAL DEVICE, AND RETRIEVAL METHOD

CROSS-REFERENCE TO RELATED APPLICATION(S)

This application is based upon and claims the benefit of priority of the prior Japanese Patent Application No. 2016-181003, filed on Sep. 15, 2016, the entire contents of which are incorporated herein by reference.

FIELD

The embodiment discussed herein is related to a retrieval program, and the like.

BACKGROUND

In recent years, high accuracy in retrieving target information from among information in an increasing information amount with development of networks is demanded.

When the amount of information is small, even when a retrieval result including noises (not intended result) is output, a user can find intended text by examining the retrieval result. However, when the amount of information is large, retrieval results increase, and it becomes difficult for a user to examine the retrieval results. Therefore, it is demanded that retrieval results with reduced noises be output.

One example of a retrieval method is explained referring to FIG. 18. FIG. 18 depicts one example of a retrieval method. As depicted in FIG. 18, a retrieval device that retrieves information performs, when text is input as search text, morphological analysis of the input text, to separate it in a word unit (S100). The retrieval device then compares separated words with a synonym dictionary in which synonyms are stored in advance (S110), generates a search word with a synonym including a matching word (S120). In the synonym dictionary, words regarded to have the same meaning in a word unit description are stored as synonyms. The retrieval device retrieves text that includes the search word from a search target document, as a retrieval result (S130, S140).

For example, in FIG. 18, suppose that a sentence "to display a clear image" is input as search text. The retrieval device then performs morphological analysis of the input sentence, to separate into words. As a result, the separated words are indicated as "image", "clear", "display". The retrieval device compares the separated words with the synonym dictionary, and generates a search word with synonyms that include a matching word. Suppose that "clear, delete", "display, express" are included in the synonym dictionary as synonyms. Accordingly, as search words, "image"; and "clear" or "delete"; and "display" or "expression" are generated. The retrieval device retrieves text that includes the search word from a search target document as a retrieval result. As a result, the retrieval device retrieves text of "to clear image data . . . ", "delete a display of an old image . . . ", and "clear a regular expression once . . . " as the retrieval result (Japanese Laid-open Patent Publication No. 2015-60243).

SUMMARY

According to an aspect of an embodiment, a non-transitory computer-readable recording medium has stored therein a program. The program causes a computer to execute a process. The process includes receiving text. The process includes generating information indicating a meaning of a word that is included in the received text, by subjecting the received text to semantic analysis. The process includes identifying a word that is associated with the generated information, by referring to a storage that stores a word and information indicating a meaning of the word in an associated manner. The process includes determining whether the identified word is included in the text data. The process includes outputting information according to a determination result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram (1) depicting one example of a semantic structure;

FIG. 3B is a diagram (2) depicting one example of a semantic structure;

FIG. 5 depicts one example of derivation of a weight vector;

FIG. 6B is a diagram (2) depicting one example of the first retrieval processing according to the embodiment;

FIG. 6C is a diagram (3) depicting one example of the first retrieval processing according to the embodiment;

FIG. 6D is a diagram (4) depicting one example of the first retrieval processing according to the embodiment;

FIG. 6E is a diagram (5) depicting one example of the first retrieval processing according to the embodiment;

FIG. 6F is a diagram (6) depicting one example of the first retrieval processing according to the embodiment;

FIG. 7 depicts a flow of the first retrieval processing according to the embodiment;

FIG. 8A is a diagram (1) depicting one example of second retrieval processing according to the embodiment;

FIG. 8B is a diagram (2) depicting one example of the second retrieval processing according to the embodiment;

FIG. 9 depicts a flow of the second retrieval processing according to the embodiment;

FIG. 11 depicts one example of a data structure of synonym-determination result data;

DESCRIPTION OF EMBODIMENT(S)

Figure 18:
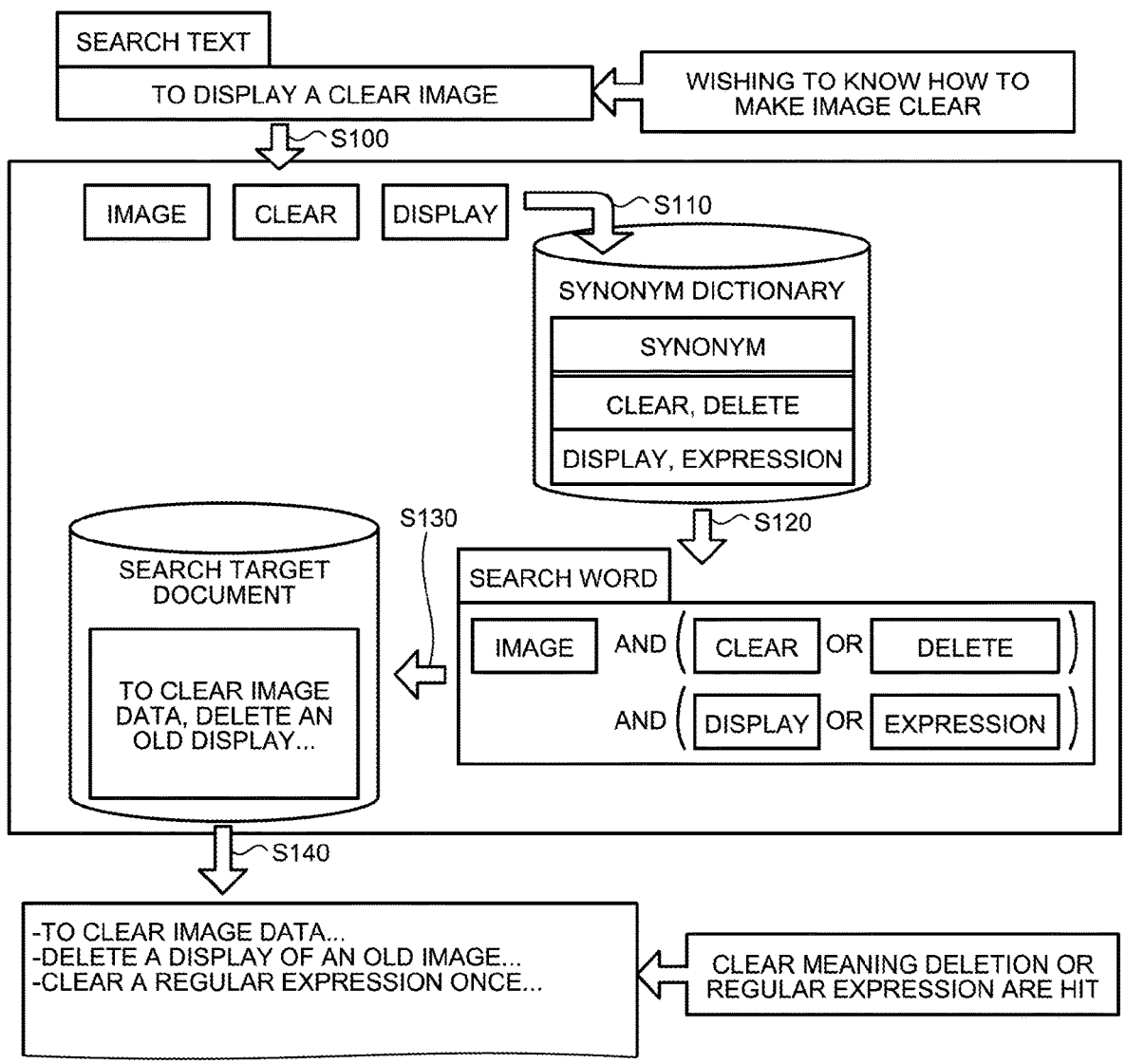
FIG. 18 depicts one example of a retrieval method.

In the conventional retrieval method, there is a problem that it is difficult to reduce noises included in a retrieval result when specific text is retrieved from a search target document. For example, in the conventional retrieval method depicted in FIG. 18, "delete" that has a different meaning from "clear" in the search text, and "expression" that can signify a different meaning from "display" in the search text are included in the search words. Therefore, the retrieval device retrieves text that includes a search word having a different meaning as a retrieval result, when retrieving specific text from a search target document. That is, text that includes "clear" or "delete" meaning different from "clear" in the search text, or that includes "expression" meaning different from "expression" in the search text can be retrieved as a retrieval result. As a result, it is difficult to reduce noises included in a retrieval result for the retrieval device.

Preferred embodiments of the present invention will be explained with reference to accompanying drawings. In the embodiment, the retrieval device is explained as an information processing apparatus. The embodiment is not intended to limit the present invention.

Configuration of Information Processing Apparatus according to Embodiment

Figure 1:
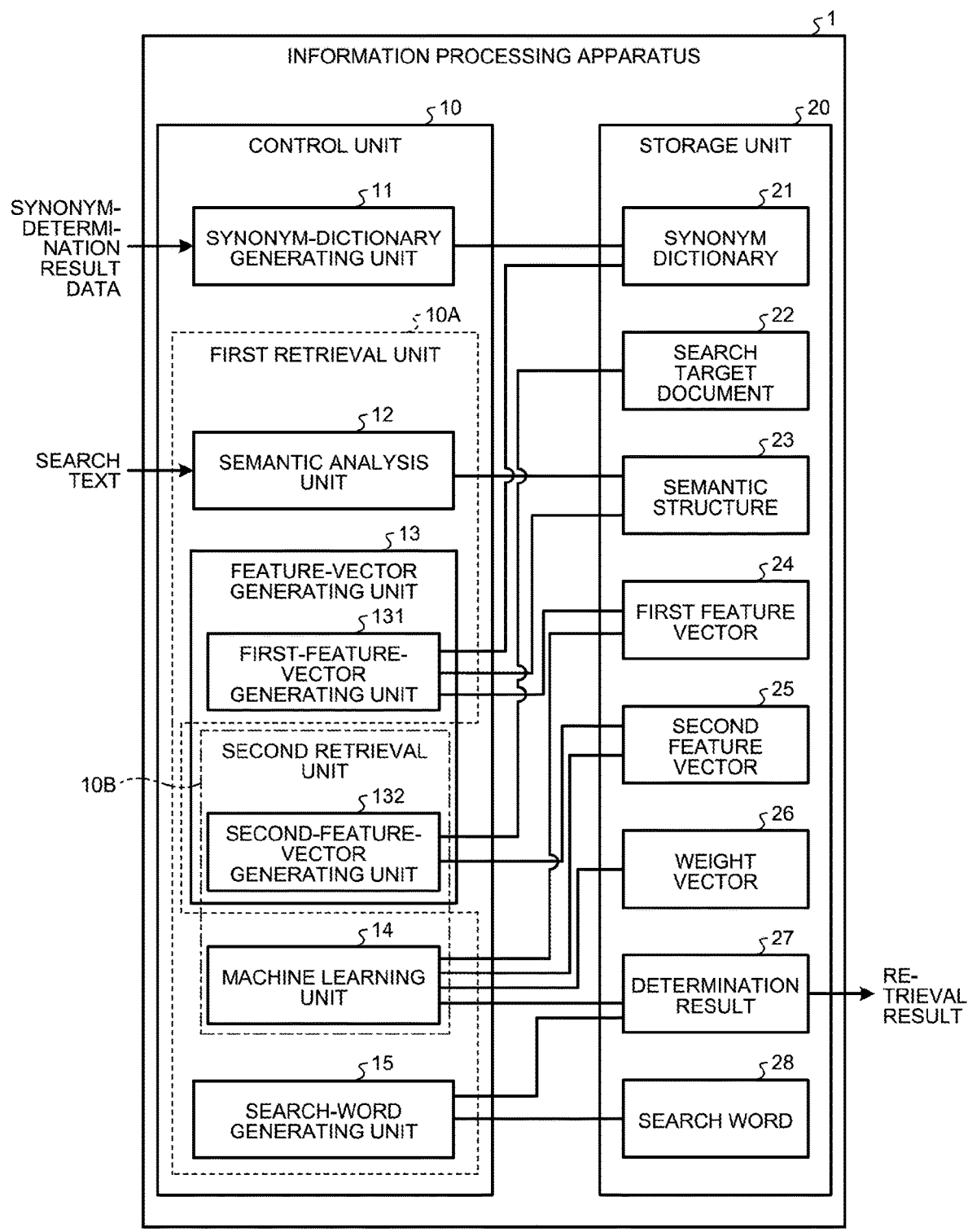
FIG. 1 is a functional block diagram depicting one example of a configuration of an information processing apparatus according to an embodiment.

FIG. 1 is a functional block diagram depicting one example of a configuration of an information processing apparatus according to the embodiment. An information processing apparatus 1 depicted in FIG. 1 performs evaluation by two-staged machine learning by using a result (referred to as "semantic structure") of semantic analysis processing of a natural language that is used in machine translation and the like, and extracts retrieval target text that includes a term having the same meaning as search text from a search target document including multiple pieces of retrieval target text. In first-level machine learning, the information processing apparatus 1 performs evaluation by combining a semantic structure of a term in search text and a semantic structure of a term in a synonym dictionary, and extracts a synonym having the same meaning as a term included in the search text from the synonym dictionary, as a search word. In second-level machine learning, the information processing apparatus 1 retrieves the term in the search target document based on the search word, and performs evaluation by combining a semantic structure of a term in hit retrieval target text and a semantic structure of the term in the search text. The information processing apparatus 1 then excludes retrieval target text that includes a polysemic word, and extracts retrieval target text that includes a term having the same meaning as the search text from multiple search target documents. "Synonyms" are words having the same meaning although the notation is different. "Polysemic words" are words having different meanings although the notation is the same.

"Text" used in the embodiment signifies a smallest meaningful unit of text. "Text" does not need to to include a subject and a predicate, but it is generally divided by a punctuation mark (○) in Japanese, and by a period (.) in English. "Text" is synonymous with "sentence". "Document" signifies text that is constituted of multiple units of text. Moreover, "semantic structure" used in the embodiment signifies a graph structure that is generated as a result of semantic analysis processing of text, that expresses a meaning of the text, and that is expressed by a node indicating a concept (meaning) and a directed arc indicating a relation of the concept. Furthermore, "semantic attribute" used in the embodiment signifies a symbol (attribute) that indicates grammatical, significant characteristic of a node of "semantic structure". Moreover, term used in the embodiment is one example of a word.

The information processing apparatus 1 includes a control unit 10 and a storage unit 20.

The control unit 10 corresponds to an electronic circuit such as a central processing unit (CPU). The control unit 10 includes an internal memory to store a program and control data that specify various kinds of processing procedures, and performs various kinds of processing by using these. The control unit 10 includes a synonym-dictionary generating unit 11, a semantic analysis unit 12, a feature-vector generating unit 13, a machine learning unit 14, and a search-word generating unit 15. The feature-vector generating unit 13 includes a first-feature-vector generating unit 131 and a second-feature-vector generating unit 132. The semantic analysis unit 12, the first-feature-vector generating unit 131, the machine learning unit 14, and the search-word generating unit 15 are included in a first retrieval unit 10A. The second-feature-vector generating unit 132 and the machine learning unit 14 are included in a second retrieval unit 10B. The first retrieval unit 10A corresponds to first-level machine learning, and the second retrieval unit 10B corresponds to second-level machine learning.

The storage unit 20 is a storage device of, for example, a semiconductor memory device, such as a random-access memory (RAM) and a flash memory, a hard disk, an optical disk, or the like. The storage unit 20 includes a synonym dictionary 21, a search target document 22, a semantic structure 23, a first feature vector 24, a second feature vector 25, a weight vector 26, a determination result 27, and a search word 28. The semantic structure 23 is one example of information indicating a meaning.

The search target document 22 is a document that includes more than one retrieval target text. The search target document 22 associates the semantic structure 23 with each of retrieval target text to store the document.

The synonym dictionary 21 is a dictionary in which terms determined to have the same meaning are grouped as synonyms. The synonym dictionary 21 stores respective terms that are determined as synonyms, associating with the semantic structure 23 of a range enabling to determine the respective terms by the meaning.

Figure 2:
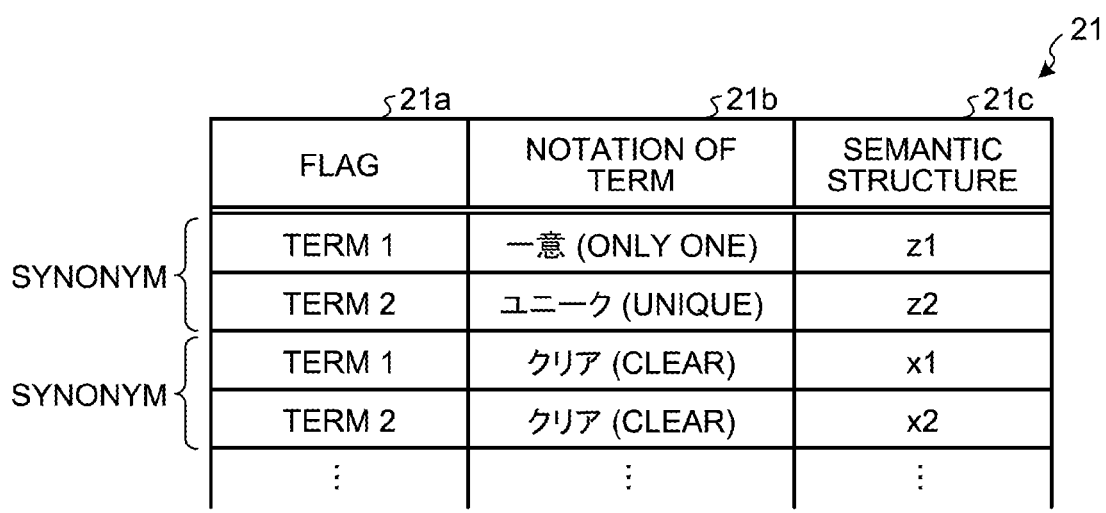
FIG. 2 depicts one example of a synonym dictionary according to the embodiment.

One example of the synonym dictionary 21 according to the embodiment is explained referring to FIG. 2. FIG. 2 depicts one example of the synonym dictionary according to the embodiment. In FIG. 2, a meaning of Japanese term " 一意 " is "only one" in English. The meaning of Japanese term " ユニーク " is "unique" in English. The meaning of Japanese term " クリア " is "clear" in English. Each term in parentheses corresponds to the preceding Japanese term. As depicted in FIG. 2, the synonym dictionary 21 stores a flag 21a, a notation of term 21b, and a semantic structure 21c, associating with each other.

The flag 21a is a flag to discriminate terms that are included in one synonym. The flag of one term included in one synonym is term 1, and the flag indicating the other term is term 2. The number of terms included in one synonym is not limited to two, but can be three or more. For example, when there are three, the flags can be set as term 1, term 2, and term 3.

The notation of term 21b indicates writing of a term included in a synonym. The semantic structure 21c is the semantic structure 23 of a range enabling to determine the meaning of a term that is indicated in the notation of term 21b. In other words, the semantic structure 21c is a range that is cut out from the semantic structure 23 of text that includes a term indicated in the notation of term 21b, in such a manner that the meaning of the term can be determined therefrom. In the following, the semantic structure 23 of a range enabling to determine the meaning of a term is referred to as "semantic structure of a term".

As one example, when the flag 21a is "term 1", "一意 (only one)" is stored as the notation of term 21b, and "z1" as the semantic structure 21c. When the flag 21a is term 2, "ユニーク (unique)" is stored as the notation of term 21b, and "z2" as the semantic structure 21c. That is, it indicates that "一意 (only one)" and "ユニーク (unique)" are synonymous. When the flag 21a is term 1, "クリア (clear)" is stored as the notation of term 21b, and "x1" as the semantic structure 21c. When the flag 21a is "term 2", "クリア (clear)" is stored as the notation of term 21b, and "x2" is stored as the semantic structure 21c. That is, it indicates that "クリア (clear)" and "クリア (clear)" are synonymous.

Figure 3C:
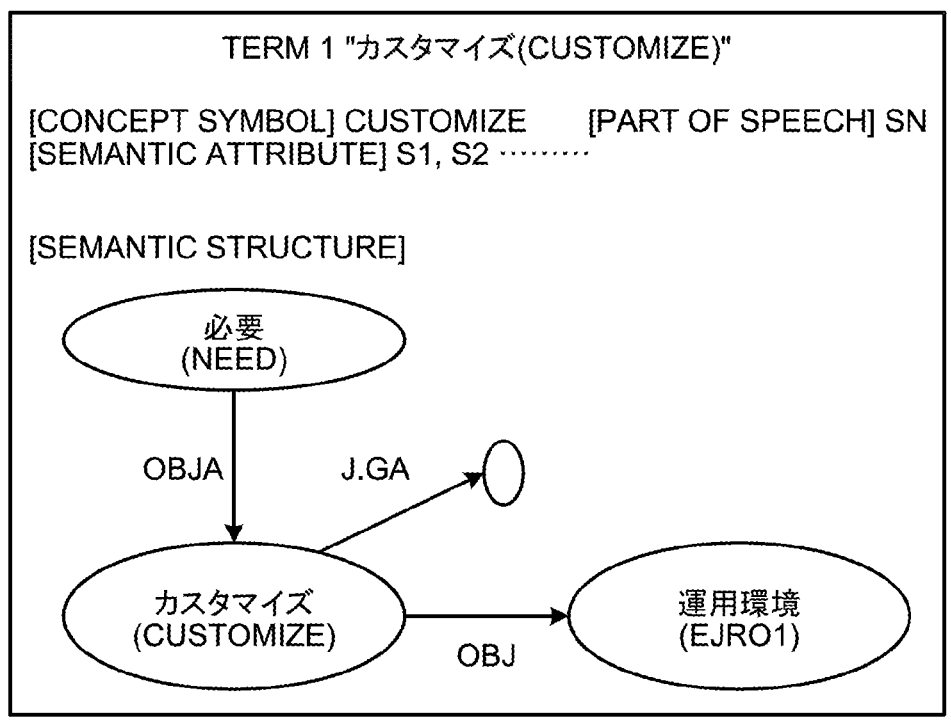
FIG. 3C depicts one example of a semantic structure of a term.

One example of the semantic structure 23 is explained referring to FIG. 3A, FIG. 3B, and FIG. 3C. FIG. 3A and FIG. 3B are diagrams depicting one example of the semantic structure. FIG. 3A depicts an internal expression of the semantic structure 23, and FIG. 3B diagrammatizes the semantic structure 23. Moreover, FIG. 3C depicts one example of the semantic structure of a term. In FIG. 3A, FIG. 3B and FIG. 3C, a meaning of Japanese term "運用環境のカスタマイズが必要です。" is "you need to customize the operational environment." in English. The meaning of Japanese term "運用環境" is "operational environment" in English. The meaning of Japanese term "カスタマイズ" is "customize" in English. The meaning of Japanese term "必要" is "need" in English. Each term in parentheses corresponds to the preceding Japanese term. The semantic structure 23 depicted in FIG. 3A and FIG. 3B is a result of the semantic analysis processing of original text, "運用環境のカスタマイズが必要です。(you need to customize the operational environment.)".

As depicted in FIG. 3A, the internal expression of the semantic structure 23 includes a term list and a graph structure.

In the term list, a list of terms is given. One term is expressed with "notation", "part of speech", "semantic attribute", and "concept symbol". The "semantic attribute" is a symbol (attribute) that signifies grammatical and semantic characteristics of a corresponding term, and has, for example, a thesaurus attribute, a countable rule, a variation rule, and the like. The thesaurus attribute is an attribute describing a semantic hierarchical relationship of a term. The "concept symbol" is a symbol to identify a concept indicated by a word in terms of meaning (conceptual level).

As one example of a term, when the notation is "カスタマイズ (customize)", Sa-column irregular conjugation noun "SN" is registered as the part of speech, "S1, S2, . . . " as the semantic attribute, and "CUSTOMIZE" as the concept symbol.

The graph structure is expressed with "From node-<arc>->(To node), and indicates that a term of (From node) is connected to a term of (To node) by <arc>. To each node, a concept symbol of a term is assigned. As one example, for (CUSTOMIZE)-<OBJ>->(EJR01), it is indicated that a node connected by a term "カスタマイズ (customize)" of the concept symbol (CUSTOMIZE) indicated by the node and the arc <OBJ> is a term "運用環境 (operational environment)" of the concept symbol (EJR01). Each node has a "notation", a "part of speech", a "semantic attribute", and a "concept symbol" listed in the term list.

As depicted in FIG. 3B, for example, the term "customize" is expressed by the concept symbol "カスタマイズ (CUSTOMIZE)". The symbol inside the parentheses is the concept symbol. Furthermore, the node of the concept symbol "CUSTOMIZE" is connected by the term "運用環境 (operational environment)" expressed by the concept symbol "EJR01" and the arc with the symbol "OBJ". Moreover, to the node of the concept symbol "CUSTOMIZE", an arc that is not present at the other node is connected. This arc expresses a symbol "J.GA". Furthermore, the node of the concept symbol "CUSTOMIZE" is connected by a term "necessary" expressed by a concept symbol "NEED" and an arc with a symbol "OBJA". That is, the semantic structure 23 is expressed by a directed graph that indicates a semantic relationship between a term and a term.

The semantic structure 23 depicted in FIG. 3C is the semantic structure 23 of term 1 "カスタマイズ (customize)". The semantic structure 23 of "カスタマイズ (customize)" includes the "concept symbol", the "part of speech", the "semantic attribute", and arcs that connect with nodes (including a NULL node) that are one node prior and subsequent to "カスタマイズ (customize)". In this example, the concept symbol of term 1 "カスタマイズ (customize)" is "CUSTOMIZE", and the part of speech is "SN", and the semantic attribute is "S1, S2, . . . ". One node prior to "カスタマイズ (customize)" is a node of the term "必要 (need)" for which the concept symbol is expressed as "NEED", and one node subsequent to "カスタマイズ (customize)" is a node of the term "運用環境 (operational environment)" for which the concept symbol is expressed as "EJR01". The arc connecting between "カスタマイズ (customize)" and "必要 (need)" is expressed as "OBJA". Moreover, the arc connecting between "カスタマイズ (customize)" and the NULL node is expressed as "J.GA". That is, the semantic structure 23 of term 1 "カスタマイズ (customize)" is a portion cut out from the semantic structure 23 of the original text "運用環境のカスタマイズが必要です。(you need to customize the operational environment.)" in a range enabling to determine the meaning of term 1 "カスタマイズ (customize)".

Referring back to FIG. 1, the synonym-dictionary generating unit 11 generates the synonym dictionary 21 including the semantic structure 23 and stores it in the storage unit 20. For example, the synonym-dictionary generating unit 11 generates the semantic structure 23 for each term (term 1, term 2) of synonyms, per synonym set in synonym-determination result data. The synonym-determination result data herein sets, for multiple terms included in multiple pieces of text in a specific field, each term (term 1, term 2) that are determined whether to be synonyms, a line number of text in which each term appears, and a flag indicating whether to be a synonym, in advance. The synonym-determination result data can set a line number of the semantic structure 23 of text in which each term appears, instead of the line number of text in which each term appears.

As one example, the synonym-dictionary generating unit 11 generates the respective semantic structures 23 by the semantic analysis processing of a natural language, for respective pieces of text corresponding to the line numbers in which respective terms (term 1, term2) that have been determined as synonyms in the synonym-determination result data appear. The synonym-dictionary generating unit 11 generates the semantic structure 23 of term 1 that is a part around term 1 cut out from the semantic structure 23 of the text in which term 1 appears. That is, the synonym-dictionary generating unit 11 extracts a part of the semantic structure 23 of the text in which term 1 appears in a range enabling to determine the meaning of term 1, to generate the semantic structure 23 of term 1. Similarly, the synonym-dictionary generating unit 11 generates the semantic structure 23 of term 2 that is a part around term 2 cut out from the semantic structure 23 of the text in which term 2 appears. That is, the synonym-dictionary generating unit 11 extracts a part of the semantic structure 23 of the text in which term 2 appears in a range enabling to determine the meaning of term 2, to generate the semantic structure 23 of term 2. The synonym-dictionary generating unit 11 then writes the flags of the respective terms, the notations of the respective terms, and the semantic structure 23 of the respective terms in the synonym dictionary 21 for term 1 and term 2.

Moreover, the synonym-dictionary generating unit 11 deletes a duplicate when the notation and the semantic structure 23 of term 1 and the notation and the semantic structure 23 of term 2 are the same in the synonym dictionary 21. The synonym-dictionary generating unit 11 deletes one pair when a pair of term 1 and term 2 is the same as another pair of term 1 and term 2 in the synonym dictionary 21.

The semantic analysis unit 12 performs semantic analysis of search text to be searched. The semantic analysis unit 12 is included in the first retrieval unit 10A. For example, the semantic analysis unit 12 performs the morphological analysis and the semantic analysis of search text to be searched, to generate the semantic structure 23. That is, the semantic analysis unit 12 generates the semantic structure 23 by performing the semantic analysis processing of a natural language for the search text to be searched.

The semantic analysis processing performed by the synonym-dictionary generating unit 11 and the semantic analysis processing performed by the semantic analysis unit 12 can be implemented by using an existing machine translation technique. For example, the semantic analysis processing can be performed by using the machine translation technique disclosed in, for example, Japanese Laid-open Patent Publication No. 06-68160, Japanese Laid-open Patent Publication No. 63-136260, or Japanese Laid-open Patent Publication No. 04-372061. Moreover, the semantic structure 23 is disclosed, for example, in Japanese Laid-open Patent Publication No. 2012-73951.

The first-feature-vector generating unit 131 generates, by combining a term in the search text and a term in the synonym dictionary 21, the first feature vector 24 to be used in the machine learning. The first-feature-vector generating unit 131 is included in the first retrieval unit 10A.

For example, the first-feature-vector generating unit 131 generates the semantic structure 23 of a term in the search text. The method of generating the semantic structure 23 of a term is the same as the method used by the synonym-dictionary generating unit 11. That is, the first-feature-vector generating unit 131 generates the semantic structure 23 of a term that is a portion around the term in the search text separated from the semantic structure 23 of the search text by the semantic analysis unit 12. Furthermore, the first-feature-vector generating unit 131 generates a feature vector from the generated semantic structure 23 of the term in the search text.

The feature vector herein signifies feature information in which the information about the semantic structure 23 of a term is the feature. For example, the feature vector is feature information in which information indicating a term (the part of speech, the semantic attribute, and the concept symbol) and information indicating a term that is directly connected to the term by an arc (the part of speech, the semantic attribute, and the concept symbol) are the features. Details of the feature vector are described later.

Moreover, the first-feature-vector generating unit 131 extracts, from the synonym dictionary 21, a different term from the term, in a group to which a term having the same notation as the term in the search text belongs. That is, the first-feature-vector generating unit 131 extracts a term having a possibility of having the same meaning as the term in the search text from the synonym dictionary 21. The first-feature-vector generating unit 131 then acquires the semantic structure 21c that is associated with the extracted term in the synonym dictionary 21. Furthermore, the first-feature-vector generating unit 131 generates the feature vector from the acquired semantic structure 21c. The structure of the feature vector is described later.

Figure 4:
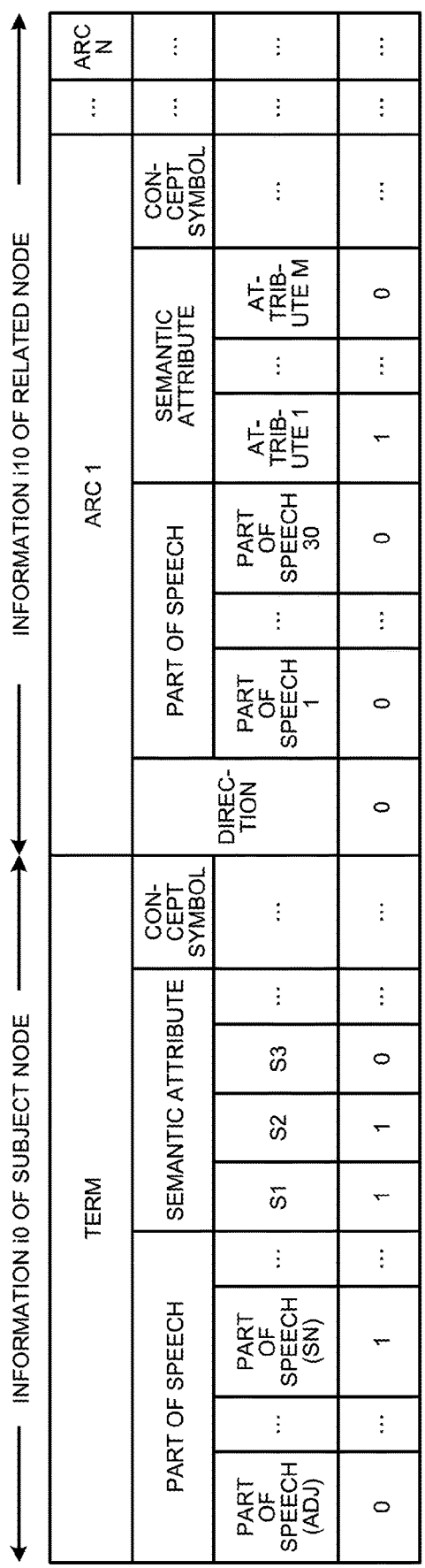
FIG. 4 depicts one example of a structure of a feature vector according to the embodiment.

One example of the structure of the feature vector is explained referring to FIG. 4. FIG. 4 depicts one example of a structure of a feature vector according to the embodiment. The feature vector depicted in FIG. 4 is an example of feature information in which information i0 of a subject node corresponding to a subject term and information i10 of a related node that corresponds to a term that is directly connected to the subject term by an arc are the features. AS depicted in FIG. 4, the feature vector includes a feature of a variety of parts of speech, a feature of a variety of semantic attributes, and a feature of a variety of concept symbols for a subject node corresponding to a subject term. As for the variety of parts of speech, for example, there are 30 kinds. As for the feature of the variety of semantic attributes, for example, there are 10000 kinds. As a value of a feature that matches with the feature of the subject term out of features of the variety of parts of speech, 1 is set. As a value of a feature that matches with the feature of a term to be judged out of features of the variety of semantic attributes, 1 is set. As a value of a feature that matches with the feature of a term to be judged out of features of the variety of concept symbols, 1 is set. In addition, the feature vector includes a feature of direction, a feature of a variety of parts of speech, a feature of a variety of semantic attributes, and a feature of a variety of concept symbols as many as the number of varieties of arcs, for a subject node corresponding to a term that is directly connected to the subject term by an arc. As for the variety of arcs, for example, there are 700 kinds. As for the feature of direction, there is one kind. As for features of the variety of parts of speech, for example, there are 30 kinds. As for features of the variety of semantic attributes, for example, there are 10000 kinds. Information about a related node that is directly connected to the subject node by an arc is set to a region corresponding to the arc. As a value of a feature that matches with the feature of the term corresponding to the related node out of the features of the variety of parts of speech, 1 is set. As a value of a feature that matches with the feature of term corresponding to the related node out of the features of the variety of semantic attributes, 1 is set. As a value of a feature that matches with the feature of term corresponding to the related node out of the features of the variety of concept symbols, 1 is set. Although in the feature vector depicted in FIG. 4, the feature at the head of the part of speech is ADJ, and the order of the features of the semantic attribute is as S1, S2, and S3, it is not limited thereto, and the features can be in the predetermined order.

Referring back to FIG. 1, the first-feature-vector generating unit 131 compares the generated two kinds of feature vectors, to generate a feature vector of a comparison result. As one example, the first-feature-vector generating unit 131 compares values of features sequentially from the feature at the head between the generated two kinds of feature vectors, and generates the feature vector of a comparison result in which a value of a matching feature is 1 and a value of a non-matching feature is 0.

The first-feature-vector generating unit 131 then generates the first feature vector 24 for machine learning, by linking the three kinds of feature vectors, namely, the two kinds of feature vectors generated respectively from the two kinds of the semantic structures 23 and the feature vector of the comparison result of the two kinds of feature vectors. By using the first feature vector 24 thus generated, it becomes possible to determine whether terms having a high possibility of signifying the same meaning signify the same meaning.

The machine learning unit 14 evaluates the first feature vector 24 with a supervised machine learner, to determine whether a term in search text and a term extracted from the synonym dictionary 21 are synonyms. The machine learner herein is, for example, a support vector machine (SVM). In the following, a case in which an SVM is adopted as the machine learner is explained. For example, in the case of the first retrieval unit 10A, the machine learning unit 14 calculates an inner product of the first feature vector 24 and the weight vector 26 that has been learned in advance based on supervising examples, to derive a general evaluation value. The machine learning unit 14 then obtains a determination result 27 indicating whether to be synonyms by judging the derived general evaluation value based on a predetermined threshold.

Furthermore, the machine learning unit 14 evaluates the second feature vector 25 with the supervised machine learner, to determine whether a term in search text and a term extracted from the search target document 22 are synonyms. For example, in the case of the second retrieval unit 10B, the machine learning unit 14 calculates an inner product of the second feature vector 25 and the weight vector 26 that has been learned in advance based on supervising examples, to derive a general evaluation value. The machine learning unit 14 then outputs a retrieval result based on the determination result 27 indicating whether to be synonyms by judging the derived general evaluation value based on a predetermined threshold.

The search-word generating unit 15 generates the search word 28 with the term in the search text and the term that has been determined as a synonym of the term in the search text in the first retrieval unit 10A. For example, the search-word generating unit 15 uses the term in the search text as the search word 28. The search-word generating unit 15 acquires the determination result 27 determining as a synonym, from among the determination results 27 obtained by the machine learning unit 14. The search-word generating unit 15 determines a term that has the acquired determination result 27 and that is extracted from the synonym dictionary 21, as the search word 28. When there are terms duplicated in notation among the terms determined as the search word 28, the search-word generating unit 15 deletes the term so that there is no duplication.

The second-feature-vector generating unit 132 generates the second feature vector 25 to be used in the machine learning, by combining a term in the search text and a term in the search target document 22 including a search word. The second-feature-vector generating unit 132 is included in the second retrieval unit 10B.

For example, the second-feature-vector generating unit 132 extracts retrieval target text that includes a term having the notation that matches with the notation of the search word 28, from among multiple pieces of retrieval target text included in the search target document 22. The second-feature-vector generating unit 132 then generates the semantic structure 23 of a term included in the extracted retrieval target text. The method of generating the semantic structure 23 of a term is the same as the method used by the synonym-dictionary generating unit 11. That is, the second-feature-vector generating unit 132 generates the semantic structure 23 of a term that is a portion around the term having the notation matching with the notation of the search word 28 from the semantic structure 23 of the retrieval target text. Furthermore, the second-feature-vector generating unit 132 generates a feature vector from the generated semantic structure 23 of the term in the retrieval target text.

Moreover, the second-feature-vector generating unit 132 receives the feature vector of the term of the search text that has been generated by the first-feature-vector generating unit 131.

Furthermore, the second-feature-vector generating unit 132 compares two kinds of the feature vectors, to generate a feature vector of a comparison result. As one example, the second-feature-vector generating unit 132 compares values of features sequentially from the feature at the head between the two kinds of feature vectors, and generates the feature vector of a comparison result in which a value of a matching feature is 1 and a value of a non-matching feature is 0.

The second-feature-vector generating unit 132 generates the second feature vector 25 for machine learning by linking the three kinds of feature vectors, namely, the two kinds of semantic structures 23 respectively generated from the two kinds of semantic structures 23 and the feature vector of the comparison result. Thereafter, the machine learning unit 14 evaluates the generated second feature vector 25, and thereby enabled to determine whether the term in the search text and the term in the retrieval target text are synonyms. In addition, the machine learning unit 14 can determine whether the term in the search text and the term in the retrieval target text have the same meaning also when the both terms have the same notation. That is, the machine learning unit 14 can determine whether the term in the search text and the term in the retrieval target text are not polysemic words. The machine learning unit 14 outputs the retrieval target text including the term that has been determined as a synonym as a retrieval result, based on the determination result 27.

The weight vector 26 used by the machine learning unit 14 is derived as follows. FIG. 5 depicts one example of derivation of a weight vector. As depicted in FIG. 5, for derivation of a weight vector, a supervising example of a positive example and a supervising example of a negative example are used. The supervising example of a positive example is a set of information in which a term to be determined as a synonym and text including the term are combined. The supervising example of a negative example is a set of information in which a term to be determined as a non-synonym and text including the term. For example, the term "カスタマイズ (customize)" in the text "運用環境のカスタマイズが必要です。(you need to customize the operational environment.)"and the term "変更 (change)" in text "運用環境の変更により、対処が必要です。(it is necessary to solve the problem by change of the operational environment.)" signify the same meaning but have different notations, and therefore are synonyms. Accordingly, the pairs of the term "カスタマイズ (customize)" that is determined with consideration given to the text "運用環境のカスタマイズが必要です。(you need to customize the operational environment.)" and the term "変更 (change)" that is determined with consideration given to the text "運用環境の変更により、対処が必要です。(it is necessary to solve the problem by change of the operational environment.)"are one example of a supervising example of a positive example. On the other hand, the term "カスタマイズ (customize)" in the text "運用環境のカスタ マイズが必要です。(you need to customize the operational environment.)" and a term "変更 (change)" in text "組織変更による 対象が必要である。(a target of structure change is necessary.)" are not terms having the same meaning and different notations, and therefore are not synonyms. Accordingly, the pairs of the term "カスタマイズ (customize)"that is determined with consideration given to the text "運用環境のカス タマイズが必要です。(you need to customize the operational environment.)" and the term "変更 (change)" that is determined with consideration given to the text "組織変更による対 象が必要である。(a target of structure change is necessary.)" are one example of a supervising example of a negative example.

As depicted in FIG. 5, a feature vector for machine learning that is generated from a supervising example of a positive example and a feature vector for machine learning that is generated from a supervising example of a negative example are input to the machine learning unit 14. In this example, ($x_{12}$, 1), ($x_{34}$, 1), and ($x_{56}$, 1) are input as supervising examples of a positive example, and ($x_{17}$, −1), ($x_{38}$, −1), and ($x_{59}$, −1) are input as supervising example of a negative example. For example, $x_{12}$ in ($x_{12}$, 1) indicates that it is a feature vector generated from document 1 and document 2, and 1 in ($x_{12}$, 1) indicates that it is a positive example. $x_{17}$ in ($x_{17}$, −1) indicates that it is a feature vector generated from example document 1 and example document 7, and −1 in ($x_{17}$, −1) indicates that it is a negative example.

Under such situation, the machine learning unit 14 derives the weight vector 26 corresponding to the input respective feature vectors for machine learning as a learning result. In this example, the weight vectors 26 corresponding to two terms are indicated. The weight vector 26 has the same structure as the feature vector for machine learning. By using these weight vectors 26, the machine learning unit 14 evaluates the first feature vector 24 by the machine learner, to determine whether the term in the search text and the term extracted from the synonym dictionary 21 are synonyms. By using these weight vectors 26, the machine learning unit 14 evaluates the second feature vector 25 with the machine learner, to determine whether the term in the search text and the term extracted from the search target document 22 are synonyms.

One Example of First Retrieval Processing

FIG. 6A to FIG. 6F are diagrams depicting one example of first retrieval processing according to the embodiment. In FIG. 6A to FIG. 6F, a meaning of Japanese term "画像をクリアに 表示するには" is "to display a clear image" in English. The meaning of Japanese term "画像" is "image" in English. The meaning of Japanese term "クリア" is "clear" in English. The meaning of Japanese term "表示" is "display" in English. The meaning of Japanese term "消去" is "delete" in English. The meaning of Japanese term "明確" is "accurate" in English. The meaning of Japanese term "鮮明" is "sharp" in English. Each term in parentheses corresponds to the preceding Japanese term. In FIG. 6A to FIG. 6F, a case in which the search text is "画像をクリアに表示するには (to display a clear image)" is explained.

Figure 6A:
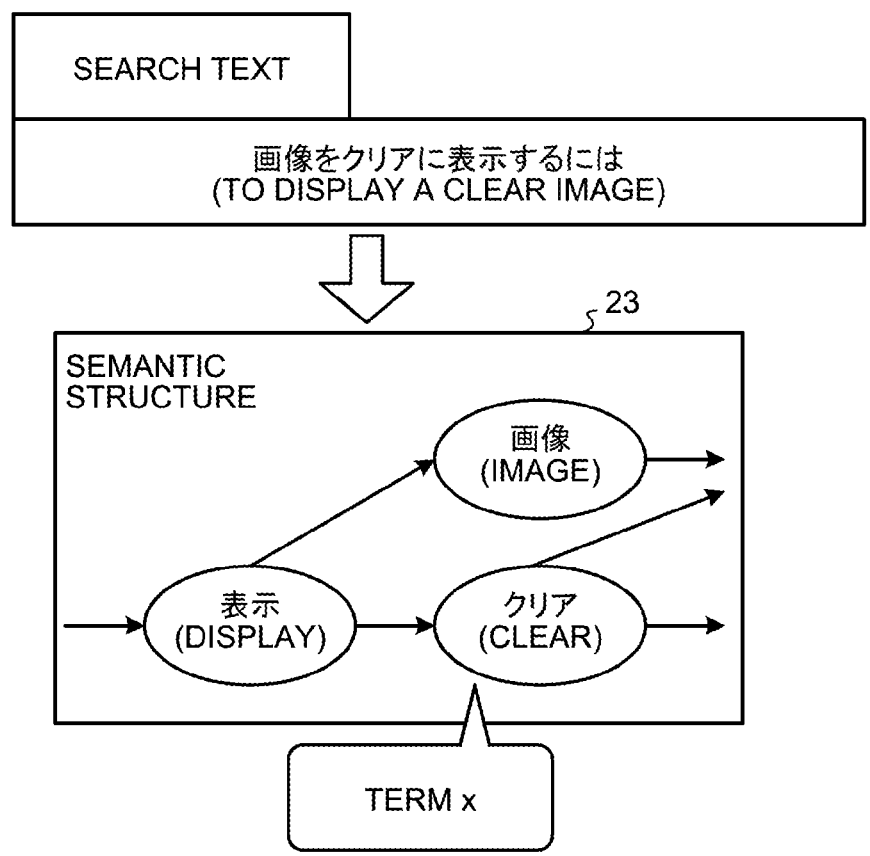
FIG. 6A is a diagram (1) depicting one example of first retrieval processing according to the embodiment.

As depicted in FIG. 6A, receiving the search text "画像をクリア に表示するには (to display a clear image)", the semantic analysis unit 12 generates the semantic structure 23 of the search text by the semantic analysis processing for the received search text. In this example, in the semantic structure 23 of the search text, nodes of terms ("画像 (image)", "クリア (clear)", and "表示 (display)") included in the search text are given.

The first-feature-vector generating unit 131 generates the semantic structure 23 of a term included in the search text. In the following, the term "クリア (clear)" is explained out of the terms "画像 (image)", "クリア (clear)", and "表示 (display)" included in the search text. In this example, the term "クリア (clear)" included in the search text is expressed as term x. The first-feature-vector generating unit 131 separates a portion around the term x from the semantic structure 23 of the search text to generate the semantic structure 23 of the term x.

As depicted in FIG. 6B, the first-feature-vector generating unit 131 generates a feature vector from the semantic structure 23 of the term x. In the feature vector of the term x, the part of speech of the term x, the feature information in which the semantic attribute is a feature, the part of speech of a term that is directly connected to the term x through an arc, and the feature information in which the semantic attribute is a feature are expressed. In this example, the concept symbol and the direction are omitted as the features.

As depicted in FIG. 6C, the first-feature-vector generating unit 131 searches the synonym dictionary 21 for a term that has the notation matching with that of the term x in the search text, and extracts the other term that is paired with the searched term. That is, a term that has a possibility of having the same meaning as the term x in the search text is extracted from the synonym dictionary 21. The extracted term is expressed as term y. In this example, as the term y, "消去 (delete)", "クリア (clear)", "クリア (clear)", "明確 (accurate)", and "鮮明 (sharp)" are extracted.

The first-feature-vector generating unit 131 then acquires the semantic structures 21c associated respectively with the extracted terms y from the synonym dictionary 21, and generates the feature vectors respectively from the semantic structures 21c of the acquired terms y. In the first row of the lower part in FIG. 6C, the feature vector of "消去 (delete)" extracted as the term y is given. In the second row, the feature vector of "クリア (clear)" extracted as the term y is given. In the third row, the feature vector of "クリア (clear)"extracted as the term y is given. In the fourth row, the feature vector of "明確 (accurate)" extracted as the term y is given. In the fifth row, the feature vector of "鮮明 (sharp)" extracted as the term y is given.

As depicted in FIG. 6D, the first-feature-vector generating unit 131 compares the feature vector of the term x and the feature vector of the term y, to generate a feature vector of a comparison result. In this example, in the first row in FIG. 6D, the feature vector of the comparison result between the feature vector of the term x and the feature vector of "消去 (delete)" extracted as the term y is given. In the second row, the feature vector of the comparison result between the feature vector of the term x and the feature vector of "クリア (clear)" extracted as the term y is given. In the third row, the feature vector of the comparison result between the feature vector of the term x and the feature vector of "クリア (clear)" extracted as the term y is given. In the fourth row, the feature vector of the comparison result between the feature vector of the term x and the feature vector of "明確 (accurate)" extracted as the term y is given. In the fifth row, the feature vector of the comparison result between the feature vector of the term x and the feature vector of "鮮明 (sharp)" extracted as the term y is given.

As depicted in FIG. 6E, the first-feature-vector generating unit 131 generates the first feature vector 24 by linking the feature vector of the term x, the feature vector of the term y, and the feature vector of the comparison result between the feature vector of the term x and the feature vector of the term y. In this example, in the first row in FIG. 6E, the first feature vector 24 in which the feature vector of the term x, the feature vector of "消去 (delete)" extracted as the term y, and the feature vector of the comparison result are linked is given. In the second row, the first feature vector 24 in which the feature vector of the term x, the feature vector of "クリア (clear)" extracted as the term y, and the feature vector of the comparison result are linked is given. In the third row, the first feature vector 24 in which the feature vector of the term x, the feature vector of "クリア (clear)" extracted as the term y, and the feature vector of the comparison result are linked is given. In the fourth row, the first feature vector 24 in which the feature vector of the term x, the feature vector of "明確 (accurate)" extracted as the term y, and the feature vector of the comparison result are linked is given. In the fifth row, the first feature vector 24 in which the feature vector of the term x, the feature vector of "鮮明 (sharp)" extracted as the term y, and the feature vector of the comparison result are linked is given.

The machine learning unit 14 evaluates the first feature vector 24 with the machine learner, to determine whether the term x and the term y are synonyms. In this example, "クリア (clear)", which is the term x, and each of "クリア (clear)", "クリア (clear)", "明確 (accurate)", and "鮮明 (sharp)" extracted as the term y are determined as synonyms.

As depicted in FIG. 6F, the search-word generating unit 15 determines "クリア (clear)", which is the term x in the search text, as the search word 28. The search-word generating unit 15 then determines "クリア (clear)", "クリア (clear)", "明確 (accurate)", and "鮮明 (sharp)" extracted as the term y and determined as the synonyms, as the search words 28. Subsequently, the search-word generating unit 15 deletes one of two "クリア (clear)" that are duplicated in notation among the search words 28, so as not to include duplication. Thus, the search words for the term x "クリア (clear)" in the search text are "クリア (clear)", "明確 (accurate)", and "鮮明 (sharp)".

Flow of First Retrieval Processing

That is, a flow of the first retrieval processing is as follows. FIG. 7 depicts the flow of the first retrieval processing according to the embodiment. In FIG. 7, a meaning of Japanese term "画像をクリアに表示するには" is "to display a clear image" in English. The meaning of Japanese term "画像" is "image" in English. The meaning of Japanese term "クリア" is "clear" in English. The meaning of Japanese term Japanese term "表示" is "display" in English. The meaning of Japanese term "消去" is "delete" in English. The meaning of Japanese term "明確" is "accurate" in English. The meaning of Japanese term "鮮明" is "sharp" in English. Each term in parentheses corresponds to the preceding Japanese term. As depicted in FIG. 7, when receiving the search text "画像をクリアに表示するには (to display a clear image)", the semantic analysis unit 12 subjects the search text to the morphological analysis to compare with the synonym dictionary 21 having semantic structures, and then performs the semantic analysis to generate the semantic structures 23.

Subsequently, the first-feature-vector generating unit 131 generates the first feature vector 24 by linking the feature vector of the term x, the feature vector of the term y, and the feature vector of the comparison result between the feature vector of the term x and the feature vector of the term y. In this example, the term x is one of the terms in the search text, "クリア (clear)". The term y is the other term paired with the term having the same notation as that of the term x in the search text, and are "明確 (accurate)", "消去 (delete)", and "鮮明 (sharp)". Suppose that the feature vector of the term x in the search text "クリア (clear)" is "ZZ3", and the feature vector "明確 (accurate)" extracted as the term y is "Z2". The first feature vector 24 of the term x "クリア (clear)" and "明確 (accurate)" extracted as the term y is then "ZZ3_Z2_ZZ3Z2". "_" indicates linkage. Suppose the feature vector of "消去 (delete)" extracted as the term y is "X2". The first feature vector 24 of the term x "クリア (clear)"and "消去 (delete)" extracted as the term y is then "ZZ3_X2_ZZ3X2". Suppose the feature vector of "鮮明 (sharp)" extracted as the term y is "Z6". The first feature vector 24 of the term x "クリア (clear)" and "鮮明 (sharp)" extracted as the term y is then "ZZ3_Z6_ZZ3Z6".

The machine learning unit 14 evaluates the respective generated first feature vectors 24 with the machine learner, and outputs the respective determination results 27. In this example, the determination result 27 obtained by evaluating the first feature vector 24 of the term x "クリア (clear)" and "明確 (accurate)" extracted as the term y is "○" indicating synonym. The determination result 27 obtained by evaluating the first feature vector 24 of the term x "クリア (clear)" and "消去 (delete)" extracted as the term y is "x" indicating non-synonym. The determination result 27 obtained by evaluating the first feature vector 24 of the term x "クリア (clear)" and "鮮明 (sharp)" extracted as the term y is "○" indicating a synonym. Thus, the machine learning unit 14 can exclude "消去 (delete)" having the different meaning from among "クリア (clear)", "消去 (delete)", "明確 (accurate)", and "鮮明 (sharp)" that have a possibility having the same meaning as that of the term "クリア (clear)" in the search text, and can extract only synonyms having the same meaning.

The search-word generating unit 15 then eliminates duplication in notation, and generates the search words, "クリア (clear)", "明確 (accurate)", and "鮮明 (sharp)".

One Example of Second Retrieval Processing

FIG. 8A and FIG. 8B are diagrams depicting one example of second retrieval processing according to the embodiment.

In FIG. 8A and FIG. 8B, a meaning of Japanese term "画像をクリアに表示するには" is "to display a clear image" in English. The meaning of Japanese term "画像" is "image" in English. The meaning of Japanese term "クリア" is "clear" in English. The meaning of Japanese term "表示" is "display" in English. The meaning of Japanese term "消去" is "delete" in English. The meaning of Japanese term "明確" is "accurate" in English. The meaning of Japanese term "鮮明" is "sharp" in English. Each term in parentheses corresponds to the preceding Japanese term. In FIG. 8A and FIG. 8B, it is supposed that the second-feature-vector generating unit 132 receives the search words, "クリア (clear)", "明確 (accurate)", and "鮮明 (sharp)" generated by the search-word generating unit 15.

As depicted in FIG. 8A, the second-feature-vector generating unit 132 extracts text that includes a term having the notation same as that of the search word 28, from multiple pieces of text (retrieval target text) included in the search target document 22. The term having the same notation as that of the term of the search word is referred to as the term y. In this example, text 1 that includes the term y having the same notation as that of the search word 28 "クリア (clear)" is extracted. Text 3 that includes the term y having the same notation as that of the search word 28 "クリア (clear)" is extracted. Text 5 that includes the term y having the same notation as that of the search word 28 "明確 (accurate)" is extracted. Text 6 that includes the term y having the same notation as that of the search word 28 "クリア (clear)" is extracted.

The second-feature-vector generating unit 132 then generates the semantic structures 23 of the respective terms y having the same notation as that of the search word 28, from the semantic structure 23 of the respective extracted pieces of text.

As depicted in FIG. 8B, the second-feature-vector generating unit 132 generates the second feature vector 25 by linking the feature vector of the term x, the feature vector of the term y, and the feature vector of the comparison result between the feature vector of the term x and the feature vector of the term y. In this example, in the first row in FIG. 8B, the second feature vector 25 in which the feature vector of the term x, the feature vector of the term y "クリア (clear)" in text 1, and the feature vector of the comparison result is given. In the second row, the second feature vector 25 in which the feature vector of the term x, the feature vector of the term y "クリア (clear)" in text 3, and the feature vector of the comparison result are linked is given. In the third row, the second feature vector 25 in which the feature vector of the term x, the feature vector of the term y "明確 (accurate)" in text 5, and the feature vector of the comparison result are linked is given. In the fourth row, the second feature vector 25 in which the feature vector of the term x, the feature vector of the term y "クリア (clear)" in text 6, and the feature vector of the comparison result are linked is given.

Thereafter, the machine learning unit 14 evaluates the generated second feature vectors 25 with the machine learner, to determine whether the term x and the term y are synonyms. In addition, the machine learning unit 14 determines whether the meaning is the same even when the notations of the term x and the term y are the same. The machine learning unit 14 then outputs text including the term y that has been determined as a synonym based on the determination result 27, as a retrieval result.

Flow of Second Retrieval Processing

That is, a flow of the second retrieval processing is as follows. FIG. 9 depicts the flow of the second retrieval processing according to the embodiment. In FIG. 9, a meaning of Japanese term "クリア" is "clear" in English. The meaning of Japanese term "明確" is "accurate" in English. The meaning of Japanese term "鮮明" is "sharp" in English. The meaning of " " is " " in English. Each term in parentheses corresponds to the preceding Japanese term. As depicted in FIG. 9, the second-feature-vector generating unit 132 searches the search target document 22 with the search word 28, extracts text that includes a term having the same notation as that of the search word 28, and separates a portion around the semantic structure 23 of the term from the semantic structure 23 of the extracted text. In this example, for text 1, "pzz1" is generated as the semantic structure 23 of the term "クリア (clear)" from the semantic structure 23 of text 1. For text 3, "pxx1" is generated as the semantic structure 23 of the term "クリア (clear)" from the semantic structure 23 of text 3. For text 5, "pzz5" is generated as the semantic structure 23 of the term "accurate" from the semantic structure 23 of text 5. For text 6, "pww6" is generated as the semantic structure 23 of the term "クリア (clear)" from the semantic structure 23 of text 6.

Subsequently, the second-feature-vector generating unit 132 generates the second feature vector 25 by linking the feature vector of the term x, the feature vector of the term y, and the feature vector of the comparison result between the feature vector of the term x and the feature vector of the term y. In this example, the term x is "クリア (clear)", which is one of the terms in the search text. The term y is a term in text having the same notation as that of the search word 28, and is "クリア (clear)" in text 1, "クリア (clear)" in text 3, "クリア (clear)" in text 6, and "明確 (accurate)" in text 5. Suppose that the feature vector of the term x "クリア (clear)" in the search text is "ZZ3", and the feature vector of the term y "クリア (clear)" in text 1 is "PZZ1". The second feature vector 25 is then "ZZ3_PZZ1_ZZ3PZZ1". "_" indicates linkage. Suppose that the feature vector of the term y "クリア (clear)" in text 3 is "PXX1". The second feature vector 25 is then "ZZ3_PXX1_ZZ3PXX1". Suppose that the feature vector of the term y "クリア (clear)" in text 6 is "PWW6". The second feature vector 25 is then "ZZ3_PWW6_ZZ3PWW6". Suppose that the feature vector of the term y "明確 (accurate)" in text 5 is "PZZ5". The second feature vector 25 is then "ZZ3_PZZ5_ZZ3PZZ5".

The machine learning unit 14 evaluates the respective generated second feature vectors 25 with the machine learner, and outputs the respective determination results 27. In this example, the determination result 27 that is obtained by evaluating the second feature vector 25 of the search word "クリア (clear)" and the term "クリア (clear)" in text 1 is "◯" indicating synonym. The determination result 27 that is obtained by evaluating the second feature vector 25 of the search word "クリア (clear)" and the term "クリア (clear)" in text 3 is "x" indicating non-synonym. The determination result 27 that is obtained by evaluating the second feature vector 25 of the search word "clearクリア (clear) and the term "クリア (clear)" in text 6 is "x" indicating non-synonym. The determination result 27 that is obtained by evaluating the second feature vector 25 of the search word "クリア (clear)" and the term "明確 (accurate)" in text 5 is "◯)" indicating synonym.

The machine learning unit 14 then outputs the term that is determined as synonym based on the determination result 27, as a retrieval result. In this example, text 1 and text 5 are output as the retrieval results. Thus, the machine learning unit 14 can exclude "クリア (clear)" having the different meaning although the notation is the same as that of the search word 28, from among "クリア (clear)" and "明確 (accurate)" in the search target document 22, and can extract "クリア (clear)" and "明確 (accurate)" having the same meaning.

Flowchart of Synonym-Dictionary Generation Processing

Figure 10:
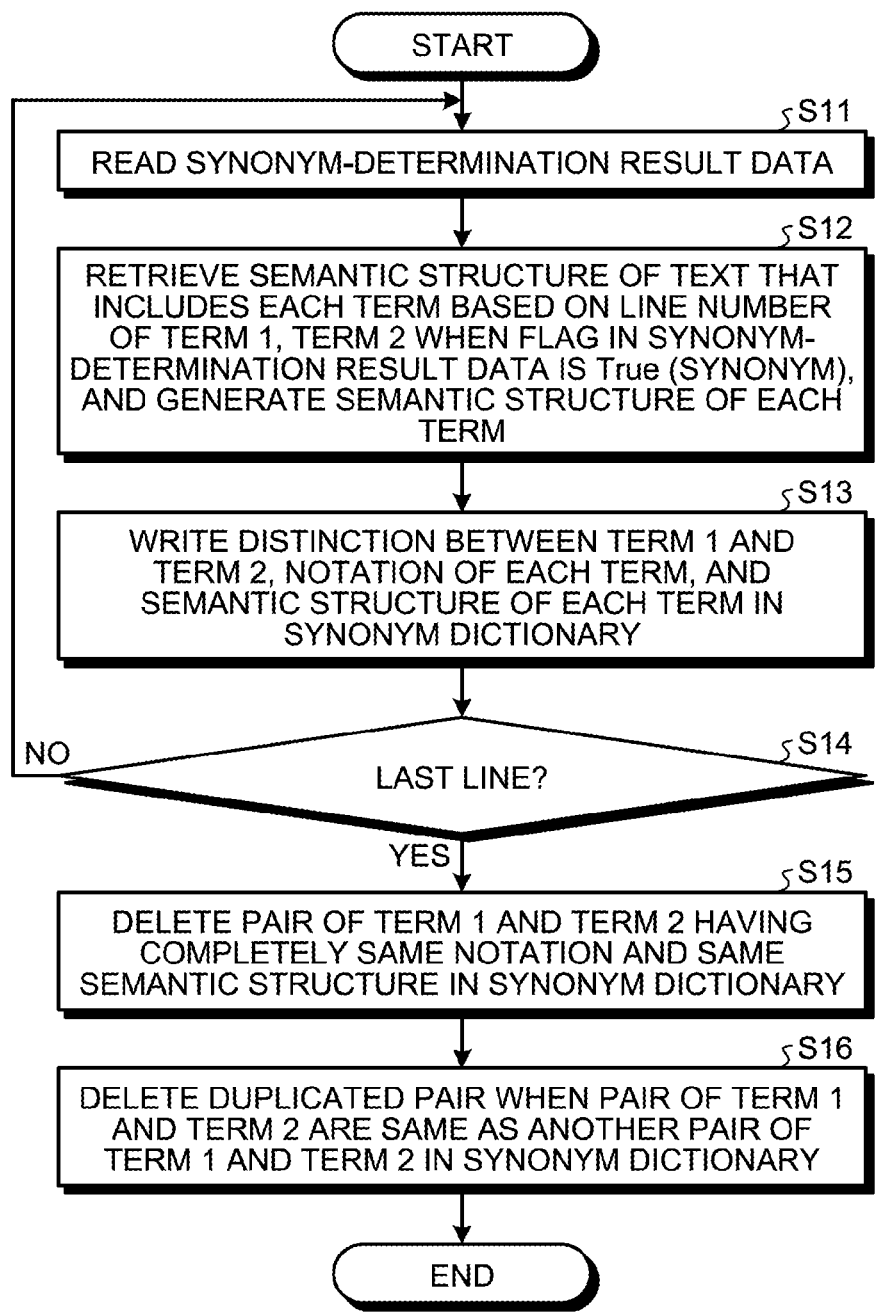
FIG. 10 depicts one example of a flowchart of synonym-dictionary generation processing according to the embodiment.

FIG. 10 depicts one example of a flowchart of synonym-dictionary generation processing according to the embodiment. As depicted in FIG. 10, the synonym-dictionary generating unit 11 reads synonym-determination result data line by line (step S11).

The synonym-dictionary generating unit 11 searches for the semantic structures 23 including the respective terms based on the line number of a term 1 and term 2 when the flag of the synonym-determination result data is "True" indicating synonym (step S12). For example, the synonym-dictionary generating unit 11 generates the semantic structure 23 of term 1 that is a portion around term 1 separated from the semantic structure 23 of text present at the line number of term 1. The synonym-dictionary generating unit 11 generates the semantic structure 23 of term 2 that is a portion around term 2 separated from the semantic structure 23 of text present at the line number of term 2.

The synonym-dictionary generating unit 11 then writes a distinction between term 1 and term 2, a notation of each term, and the semantic structure 23 of each term in the synonym dictionary 21 (step S13). For example, the synonym-dictionary generating unit 11 stores "term 1" as the flag 21a, the notation of term 1 as the notation of term 21b, and the semantic structure of term 1 as the semantic structure 21c in the synonym dictionary 21 as one of the pair. The synonym-dictionary generating unit 11 stores "term 2" as the flag 21a, the notation of term 2 as the notation of term 21b, and the semantic structure of term 2 as the semantic structure 21c in the synonym dictionary 21 as the other one of the pair.

Subsequently, the synonym-dictionary generating unit 11 determines whether it is at the last line of the synonym-determination result data (step S14). When determining that it is not at the last line (step S14: NO), the synonym-dictionary generating unit 11 shifts to step S11 to read the next line.

On the other hand, when determining that it is at the last line (step S14: YES), the synonym-dictionary generating unit 11 deletes a pair in which the notation and the semantic structure 23 are the same in term 1 and term 2 in the synonym dictionary 21 (step S15). In addition, the synonym-dictionary generating unit 11 eliminates duplication when a pair of term 1 and term 2 and another pair of term 1 and term 2 are the same in the synonym dictionary 21 (step S16). The synonym-dictionary generating unit 11 ends the synonym-dictionary generation processing.

The data structure of the synonym-determination result data that is used in the flowchart of FIG. 10 is explained referring to FIG. 11. FIG. 11 depicts one example of a data structure of the synonym-determination result data. As depicted in FIG. 11, in the synonym-determination result data, a flag, a notation of term 1, a line number of a semantic structure of text including term 1, a notation of term 2, and a line number of a semantic structure of text including term 2 are associated with each other. The flag indicates whether it is a synonym. When it is a synonym, "True" is set, and when it is not a synonym, "False" is set. The notation of term 1 is a notation of one of a pair of terms determined whether it is a synonym. The line number of a semantic structure of text including term 1 indicates a line number at which the semantic structure of the text including term 1 is present. The notation of term 2 is a notation of the other one of the pair of terms determined whether it is a synonym. The line number of a semantic structure of text including term 2 indicates a line number at which the semantic structure of the text including term 2 is present. When more than one term having the same notation is present in text, information about a column position in text can be added.

Flowchart of Retrieval Processing

Figure 12:
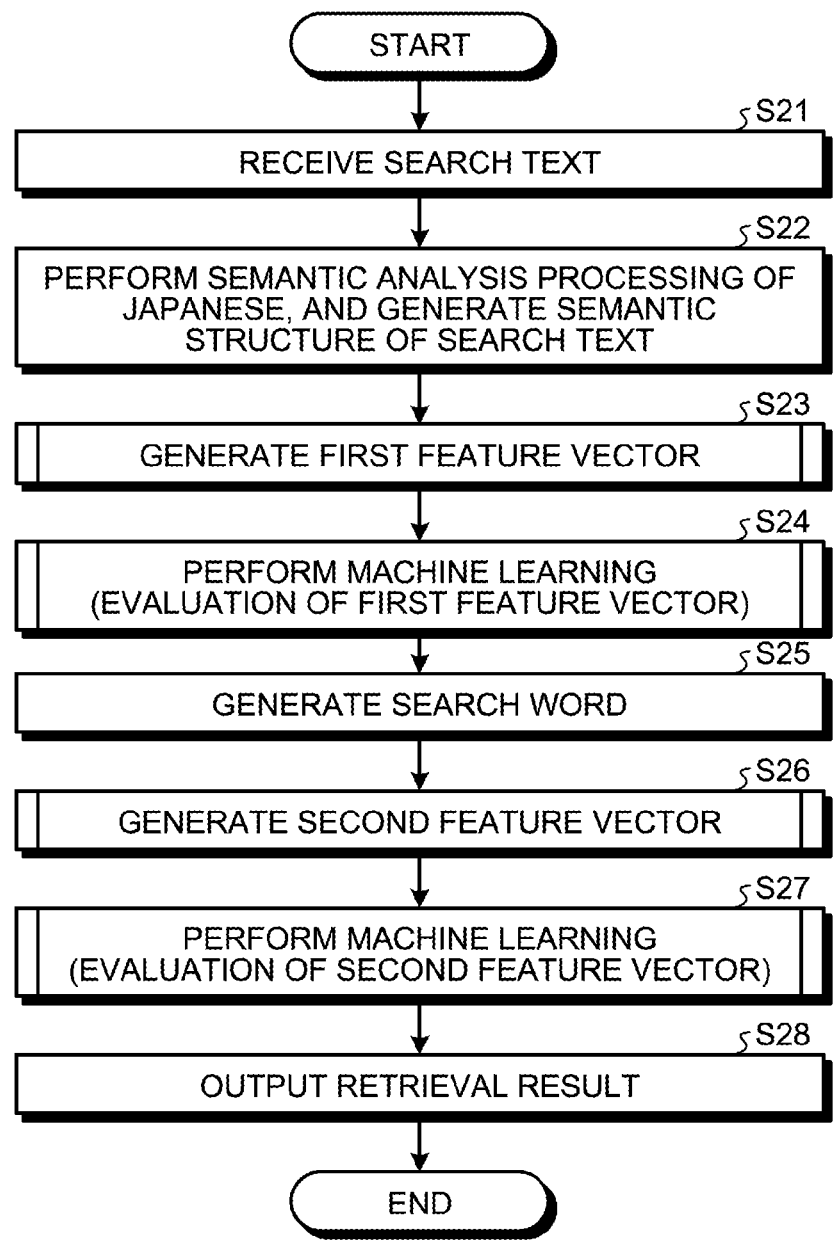
FIG. 12 depicts one example of a flowchart of retrieval processing according to the embodiment.

FIG. 12 depicts one example of a flowchart of the retrieval processing according to the embodiment. It is assumed that the synonym dictionary 21 is generated by the synonym-dictionary generating unit 11 and is stored in the storage unit 20.

As depicted in FIG. 12, receiving search text (step S21), the semantic analysis unit 12 performs the semantic analysis processing of Japanese, to generate the semantic structure 23 of the search text (step S22).

Subsequently, the first-feature-vector generating unit 131 generates the first feature vector 24 by using the generated semantic structure 23 of the search text and the synonym dictionary 21 (step S23). A flowchart of the generation processing of the first feature vector 24 is described later.

The machine learning unit 14 performs machine learning to evaluate the generated first feature vector 24 (step S24). The machine learning unit 14 performs machine learning based on supervising examples and derives the weight vector 26 as a learning result. The machine learning unit 14 then performs machine learning by using the weight vector 26, which is the learning result. A flowchart of the processing in the machine learning is described later.

The search-word generating unit 15 generates the search word 28 based on the determination result 27 of the machine learning (step S25). A flowchart of the generation processing of the search word 28 is described later.

Subsequently, the second-feature-vector generating unit 132 generates the second feature vector 25 by using the generated search word 28 and the search target document 22 (step S26). A flowchart of the generation processing of the second feature vector 25 is described later.

The machine learning unit 14 then performs machine learning to evaluate the generated second feature vector 25 (step S27). The machine learning unit 14 performs machine learning by using the weight vector 26 used at step S24. A flowchart of the processing in the machine learning is described later.

The machine learning unit 14 then outputs retrieval target text corresponding to the search text based on the determination result 27 of the machine learning (step S28). The control unit 10 ends the retrieval processing.

Flowchart of First-Feature-Vector Generation Processing

Figure 13:
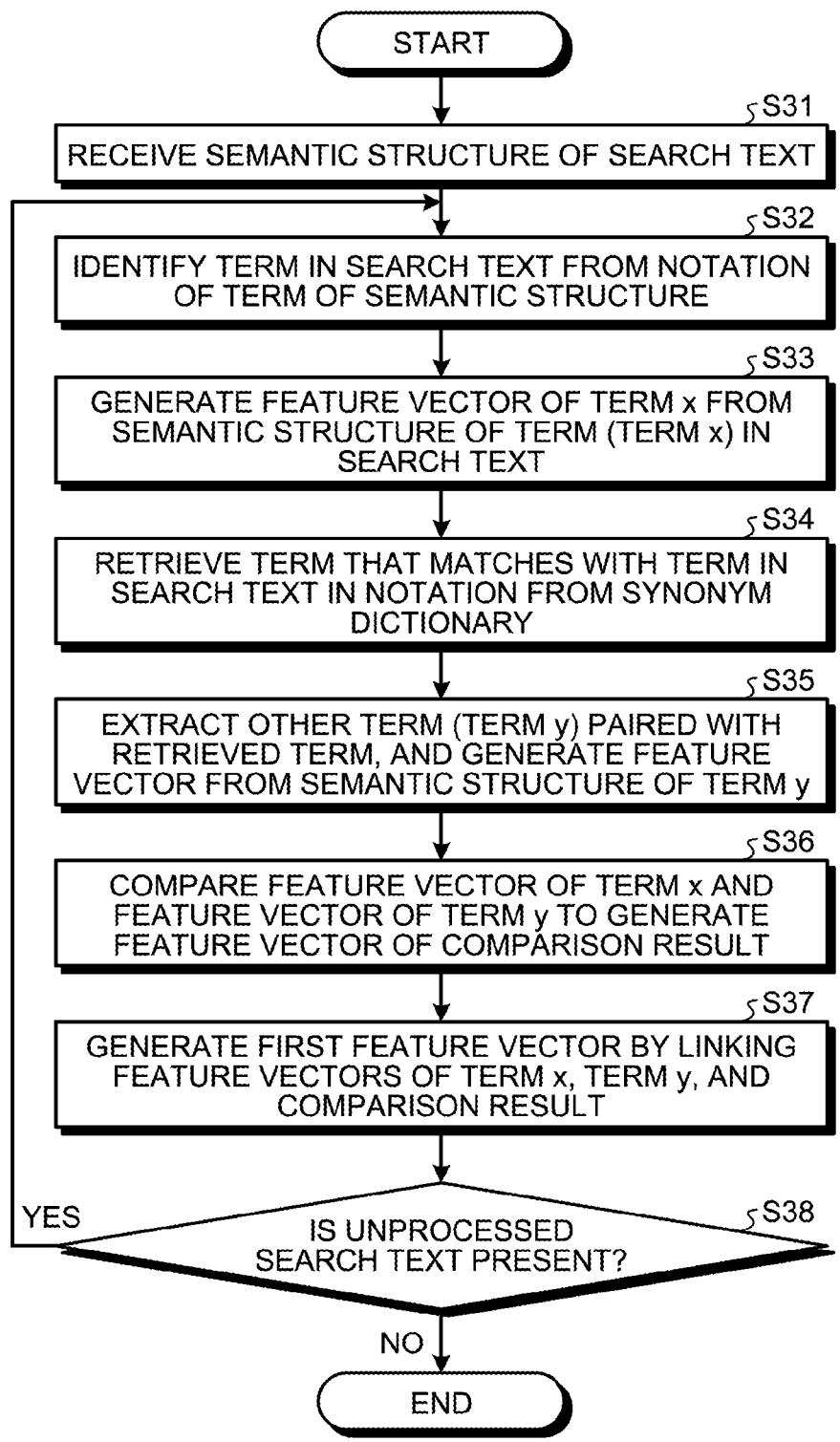
FIG. 13 depicts one example of a flowchart of first feature-vector-generation processing according to the embodiment.

FIG. 13 depicts one example of a flowchart of the first feature-vector-generation processing according to the embodiment.

The first-feature-vector generating unit 131 receives the semantic structure 23 of search text (step S31). The first-feature-vector generating unit 131 identifies a term of the search text from the notation of the term of the semantic structure 23 of the search text (step S32). From the semantic structure 23 of the term (term x) of the search text, the first-feature-vector generating unit 131 generates a feature vector of the term x (step S33). For example, the first-feature-vector generating unit 131 generates the semantic structure 23 of the term x that is a portion around the term x separated from the semantic structure 23 of the search text, and generates the feature vector of the term x from the generated semantic structure 23 of the term x.

Subsequently, the first-feature-vector generating unit 131 retrieves a term that has a notation matching with the notation of the term x of the search text from the synonym dictionary 21 (step S34). The first-feature-vector generating unit 131 then extracts the other term (term y) that is paired with the retrieved term, and generates a feature vector of the term y from the semantic structure 21c associated with the term y (step S35).

Subsequently, the first-feature-vector generating unit 131 compares the feature vector of the term x in the search text and the feature vector of the term y, to generate a feature vector of a comparison result (step S36). The first-feature-vector generating unit 131 then generates the first feature vector 24 by linking the feature vectors of the term x in the search text, the term y, and the comparison result (step S37).

Subsequently, the first-feature-vector generating unit 131 determines whether a term of the search text that has not been processed is present (step S38). When determining that a term of the search text that has not been processed is present (step S38: YES), the first-feature-vector generating unit 131 shifts to step S32 to identify a next term of the search text.

On the other hand, when determining that a term of the search text that has not been processed is not present (step S38: NO), the first-feature-vector generating unit 131 ends the first-feature-vector generation processing.

Flowchart of Second-Feature-Vector Generation Processing

Figure 14:
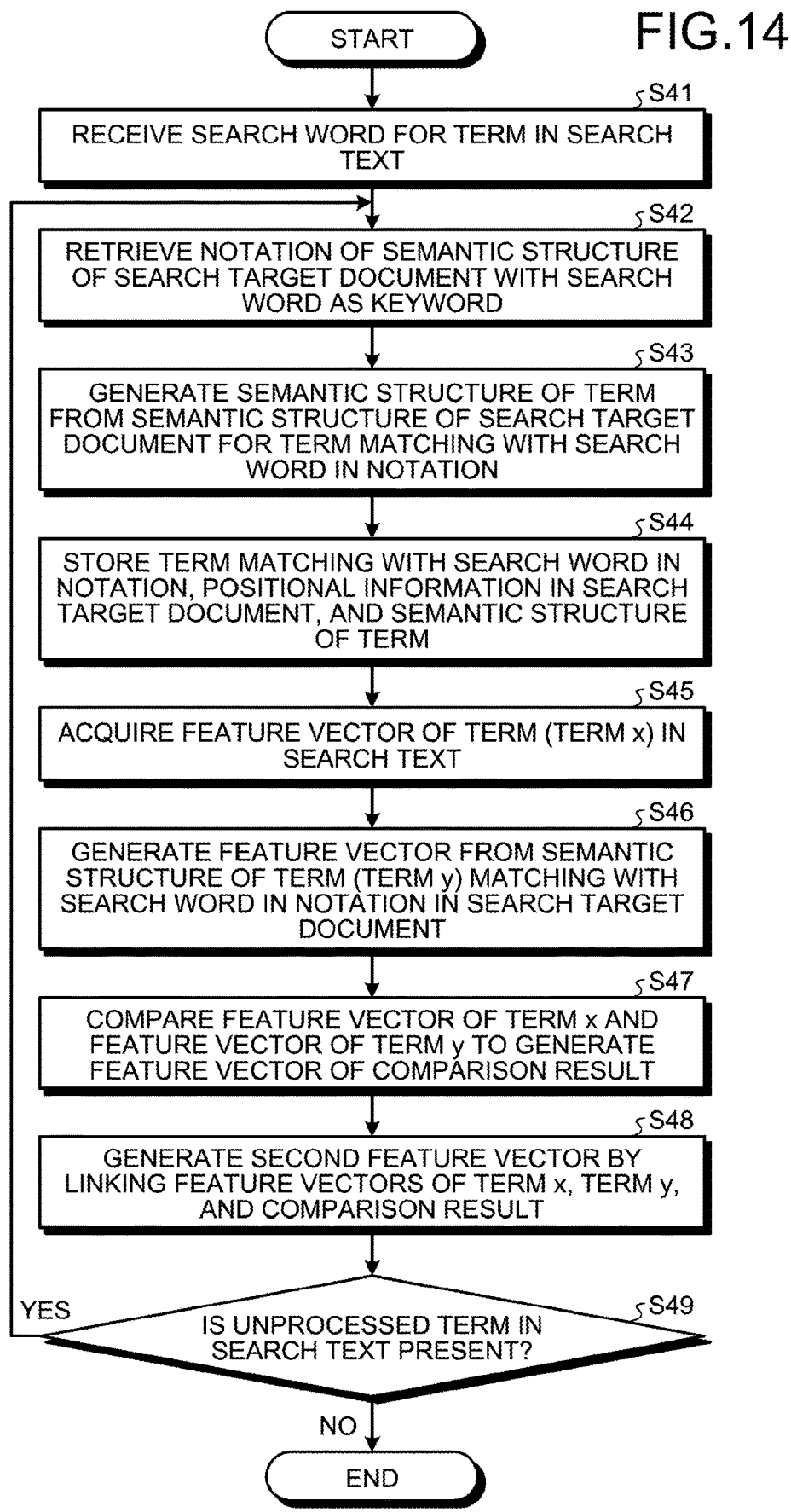
FIG. 14 depicts one example of a flowchart of second feature-vector-generation processing according to the embodiment.

FIG. 14 depicts one example of a flowchart of the second feature-vector-generation processing according to the embodiment.

The second-feature-vector generating unit 132 receives the search word 28 corresponding to a term of the search text (step S41). The second-feature-vector generating unit 132 retrieves a notation of the semantic structure 23 of the search target document 22 with the search word 28 as a keyword (step S42). The second-feature-vector generating unit 132 generates the semantic structure 23 of a term having the notation matching with the notation of the search word 28, from the semantic structure of the search target document 22 (step S43).

The second-feature-vector generating unit 132 temporarily stores the term having the notation matching with the search word 28, the positional information of the term in the search target document 22, and the semantic structure 23 of the term, associating with each other (step S44).

The second-feature-vector generating unit 132 acquires the feature vector of the term (term x) of the search text (step S45). For example, the second-feature-vector generating unit 132 can acquire the feature vector of the term x generated by the first-feature-vector generating unit 131.

The second-feature-vector generating unit 132 then generates a feature vector from the semantic structure 23 of the term (term y) having the notation that matches with the search word 28 in the search target document 22 (step S46). For example, the second-feature-vector generating unit 132 generates the feature vector from the semantic structure 23 of the term that is associated with a term having the notation that matches with the search word 28, temporarily stored.

Subsequently, the second-feature-vector generating unit 132 compares the feature vector of the term x of the search text and the feature vector of the term y to generate a feature vector of a comparison result (step S47). The second-feature-vector generating unit 132 then generates the second feature vector 25 by linking the feature vectors of the term x of the search text, the term y, and the comparison result (step S48).

The second-feature-vector generating unit 132 determines whether a term of the search text that has not been processed is present (step S49). When determining that a term of the search text that has not been processed is present (step S49: YES), the second-feature-vector generating unit 132 shifts to step S42 to process a next term of the search text.

On the other hand, when determining that a term of the search text that has not been processed is not present (step S49: NO), the second-feature-vector generating unit 132 ends the second-feature-vector generation processing.

Flowchart of Machine Learning Processing

Figure 15:
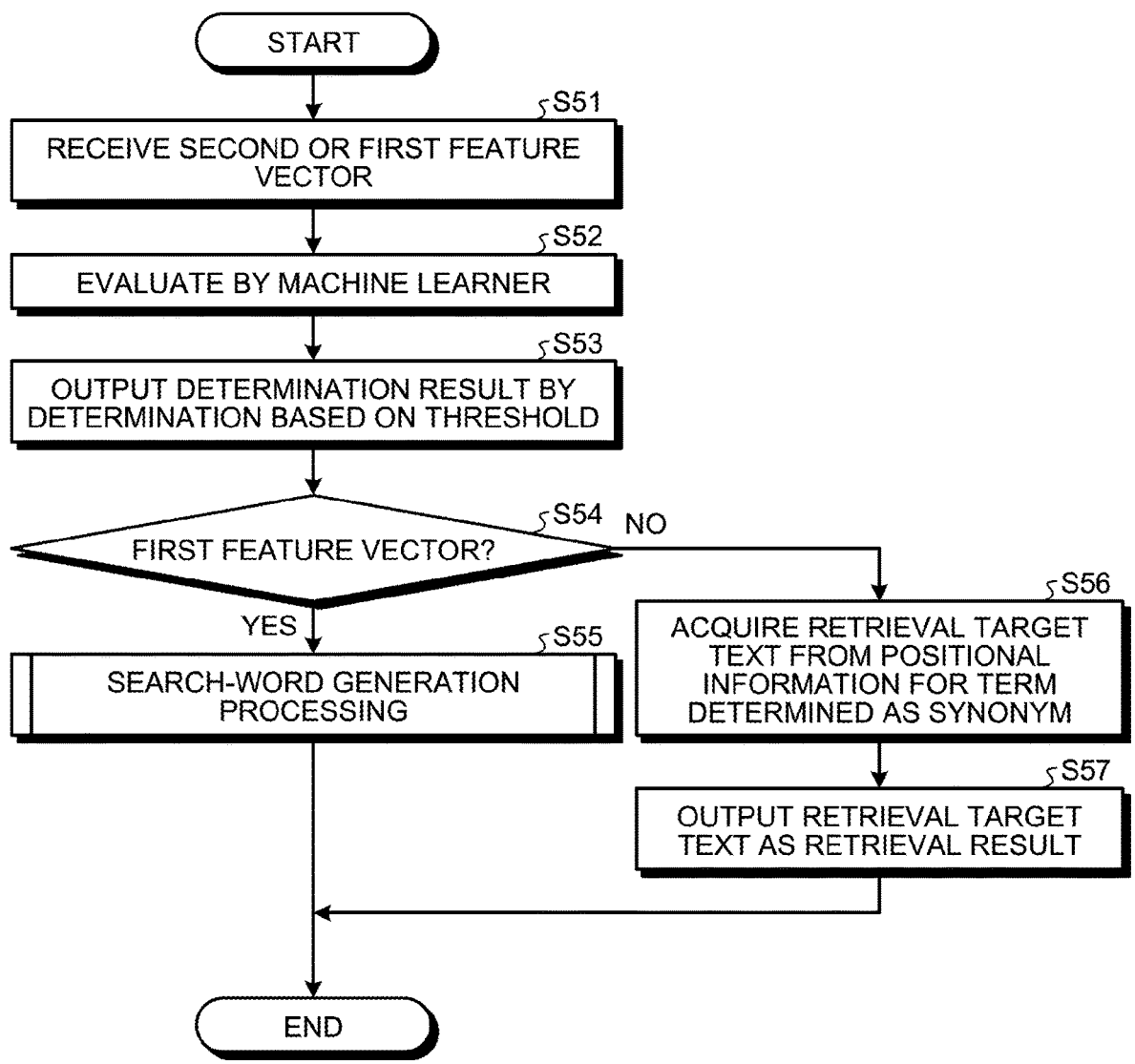
FIG. 15 depicts one example of a flowchart of machine learning processing according to the embodiment.

FIG. 15 depicts one example of a flowchart of the machine learning processing according to the embodiment.

As depicted in FIG. 15, the machine learning unit 14 receives the first or the second feature vector 24, 25 (step S51). For example, the machine learning unit 14 receives the first feature vector 24 from the first-feature-vector generating unit 131. The machine learning unit 14 receives the second feature vector 25 from the second-feature-vector generating unit 132.

The machine learning unit 14 inputs the received first feature vector 24 or the second feature vector 25 into the machine learner, to perform evaluation by the machine learner (step S52). For example, when receiving the first feature vector 24, the machine learning unit 14 calculates the inner product of the first feature vector 24 and the weight vector 26, to derive a general evaluation value. The machine learning unit 14 then obtains the determination result 27 indicating whether it is a synonym by determining the derived general evaluation value based on a predetermined threshold, and outputs the obtained determination result 27 (step S53). Moreover, the machine learning unit 14 obtains the determination result 27, also when receiving the second feature vector 25, by using the weight vector 26 and a predetermined threshold similarly to the case when receiving the first feature vector 24, and outputs the obtained determination result 27 (step S53).

The machine learning unit 14 determines whether the received feature vector is the first feature vector 24 (step S54). When the received feature vector is the first feature vector 24 (step S54: YES), the machine learning unit 14 performs generation processing of the search word (step S55). A flowchart of search-word generation processing is described later. The machine learning unit 14 then ends the machine learning processing.

On the other hand, when determining that the received feature vector is not the first feature vector 24 (step S54: NO), for a term that has been determined as synonym, the machine learning unit 14 acquires retrieval target text in the search target document 22 from the positional information (step S56). The machine learning unit 14 then outputs the retrieval target text as a retrieval result (step S57). The machine learning unit 14 ends the machine learning processing.

Flowchart of Search-Word Generation Processing

Figure 16:
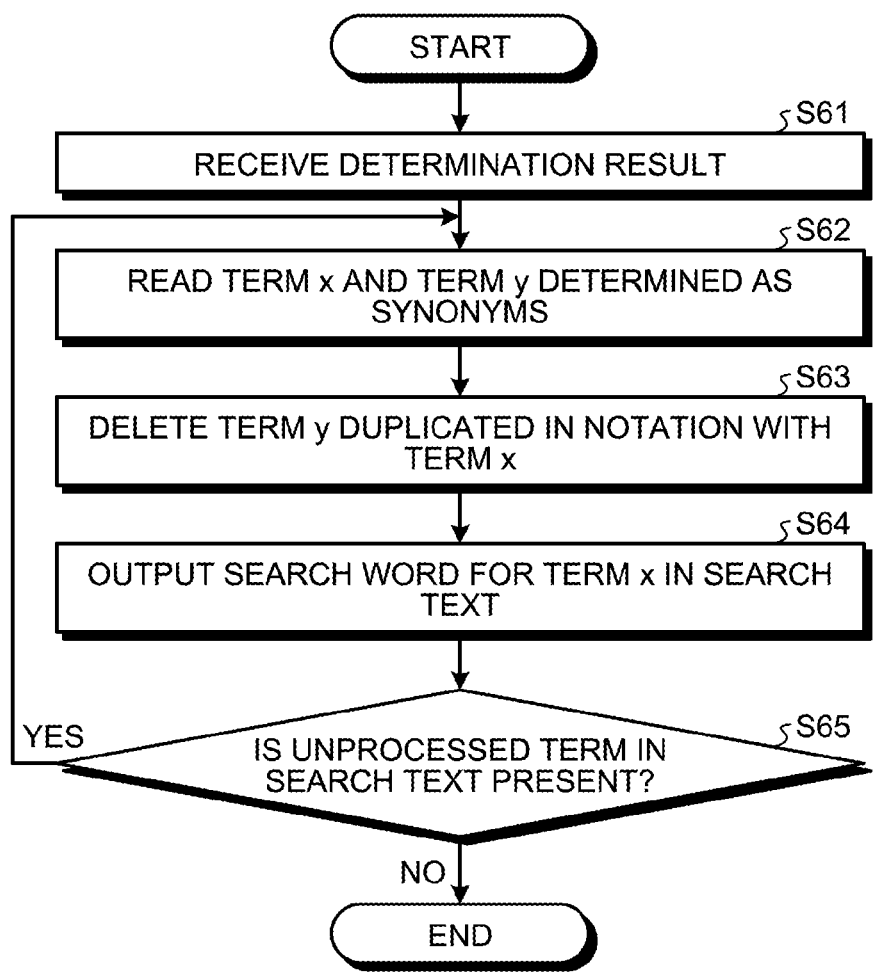
FIG. 16 depicts one example of a flowchart of search-word generation processing according to the embodiment.

FIG. 16 depicts one example of a flowchart of the search-word generation processing according to the embodiment.

As depicted in FIG. 16, the search-word generating unit 15 receives the determination result 27 from the machine learning unit 14 (step S61). The search-word generating unit 15 reads the term x and the term y that have been determined as synonyms from the determination result 27 (step S62). Subsequently, the search-word generating unit 15 deletes the term y duplicated in notation with the term x (step S63).

The search-word generating unit 15 outputs the term y corresponding to the term x as a search word (step S64). The search-word generating unit 15 determines whether a term of the search text that has not been processed is present (step S65). When determining that a term of the search text that has not been processed is present (step S65: YES), the search-word generating unit 15 shifts to step S62 to process the determination result 27 of a next term of the search text.

On the other hand, when determining that a term of the search text that has not been processed is not present (step S65: NO), the search-word generating unit 15 ends the search-word generation processing.

Effects of Embodiment

As described, the information processing apparatus 1 accepts search text when retrieving specific text from the search target document 22. The information processing apparatus 1 subjects the accepted search text to the semantic analysis, and generates the semantic structure 23 indicating the meaning of a word included in the accepted search text. The information processing apparatus 1 refers to the synonym dictionary 21 in which a word included in the accepted search text and the semantic structure 23 indicating the meaning of the word are stored in an associated manner, and identifies a word that is associated with the generate semantic structure 23. The information processing apparatus 1 determines whether the identified word is included in the search target document 22, and outputs information according to a result of determination. According to such a configuration, the information processing apparatus 1 can identify a search word used when retrieving a specific document from the search target document by identifying a word that is acquired in combination with the meaning of the word in the search text and the meaning of a word in the synonym dictionary 21. As a result, the information processing apparatus 1 can reduce noises included in a retrieval result by retrieving specific text from the search target document 22 with the search word. That is, the information processing apparatus 1 can reduce a chance of retrieving specific text that is not intended to be retrieved from the search target document 22.

Furthermore, the information processing apparatus 1 performs the following processing when it is determined that the identified word is included in the search target document 22. The information processing apparatus 1 refers to a second storage unit in which respective words included in the search target document 22 are associated with the semantic structures 23 indicating the meaning of the respective words, and identifies a word that is associated with the semantic structure 23 of the word included in the search text. The information processing apparatus 1 determines which of sentences in the search target document 22 the identified word is included, and outputs information according to a result of determination. According to such a configuration, the information processing apparatus 1 can reduce noises included in a retrieval result, by retrieving specific text from the search target document 22 by using the combination of the meaning of the word in the search text and the meaning of the identified word (search word 28) included in the search target document 22. For example, the information processing apparatus 1 can exclude specific text that includes a polysemic word having the same notation but signifying a different meaning.

Moreover, the information processing apparatus 1 refers to the second storage unit and identifies the semantic structure 23 that is associated with a word that matches with a word identified by referring to the synonym dictionary 21. The information processing apparatus 1 identifies the word that is associated with the semantic structure 23 of the word included in the search text, by using the identified semantic structure 23 and the semantic structure of the word included in the search text. According to such a configuration, the information processing apparatus 1 can identify a word included in the specific text in the search target document 22 by identifying a word that is acquired by using the combination of the meaning of a word in the search text and the meaning of the identified word (search word 28) included in the search target document 22. As a result, the information processing apparatus 1 can retrieve specific text in the search target document 22 by using the identified word, and can reduce a chance of the specific text being a noise.

Moreover, the information processing apparatus 1 extracts information indicating a relationship between a word included in the search text and another word that is directly related with the word, from the semantic structure 23 of the accepted search text. The information processing apparatus 1 generates the semantic structure 23 with the extracted information. According to such a configuration, the information processing apparatus 1 can generate information that indicates the meaning of a word included in the search text by generating the semantic structure 23 with the information that indicates the relationship between a word included in the search text and another word that is directly related therewith.

Others

It has been explained that the synonym dictionary 21 according to the embodiment stores respective terms (term 1, term 2) that have been determined as synonyms, associating with the semantic structures 23 of the respective terms. However, the synonym dictionary 21 is not limited thereto, and can store the terms determined as synonyms associating with the feature vectors of the respective terms. In such a case, the synonym-dictionary generating unit 11 generates the semantic structure 23 of text in which the respective terms determined as synonyms appear by the semantic analysis processing. The synonym-dictionary generating unit 11 generates the semantic structure 23 of term 1 that is a portion around term 1 separated from the semantic structure 23 of text in which term 1 appears. The synonym-dictionary generating unit 11 generates the semantic structure 23 of term 2 that is a portion around term 2 separated from the semantic structure 23 of text in which term 2 appears. The synonym-dictionary generating unit 11 then generates a feature vector of term 1 from the generated semantic structure 23 of term 1. The synonym-dictionary generating unit 11 generates a feature vector of term 2 from the generated semantic structure 23 of term 2. The synonym-dictionary generating unit 11 can write the notations of the terms and the feature vectors of the terms in the synonym dictionary 21 for term 1 and term 2. Thus, the first-feature-vector generating unit 131 can acquire the feature vector of the corresponding term directly, instead of the semantic structure 23 of the corresponding term.

Furthermore, the respective components of the information processing apparatus 1 illustrated do not need to be configured physically as illustrated. That is, specific forms of distribution and integration of the information processing apparatus 1 are not limited to the ones illustrated, and all or a part thereof can be configured to be distributed or integrated functionally or physically in arbitrary units according to various kinds of loads, usage conditions, and the like. For example, the semantic analysis unit 12 and the first-feature-vector generating unit 131 can be integrated into one unit. Moreover, the machine learning unit 14 can be separated into a first machine learning unit that learns the weight vector 26, a second machine learning unit that evaluates the first feature vector 24, and a third machine learning unit that evaluates the second feature vector 25. Furthermore, the storage unit 20 can be arranged as an external device from the information processing apparatus 1 connected through a network.

Figure 17:
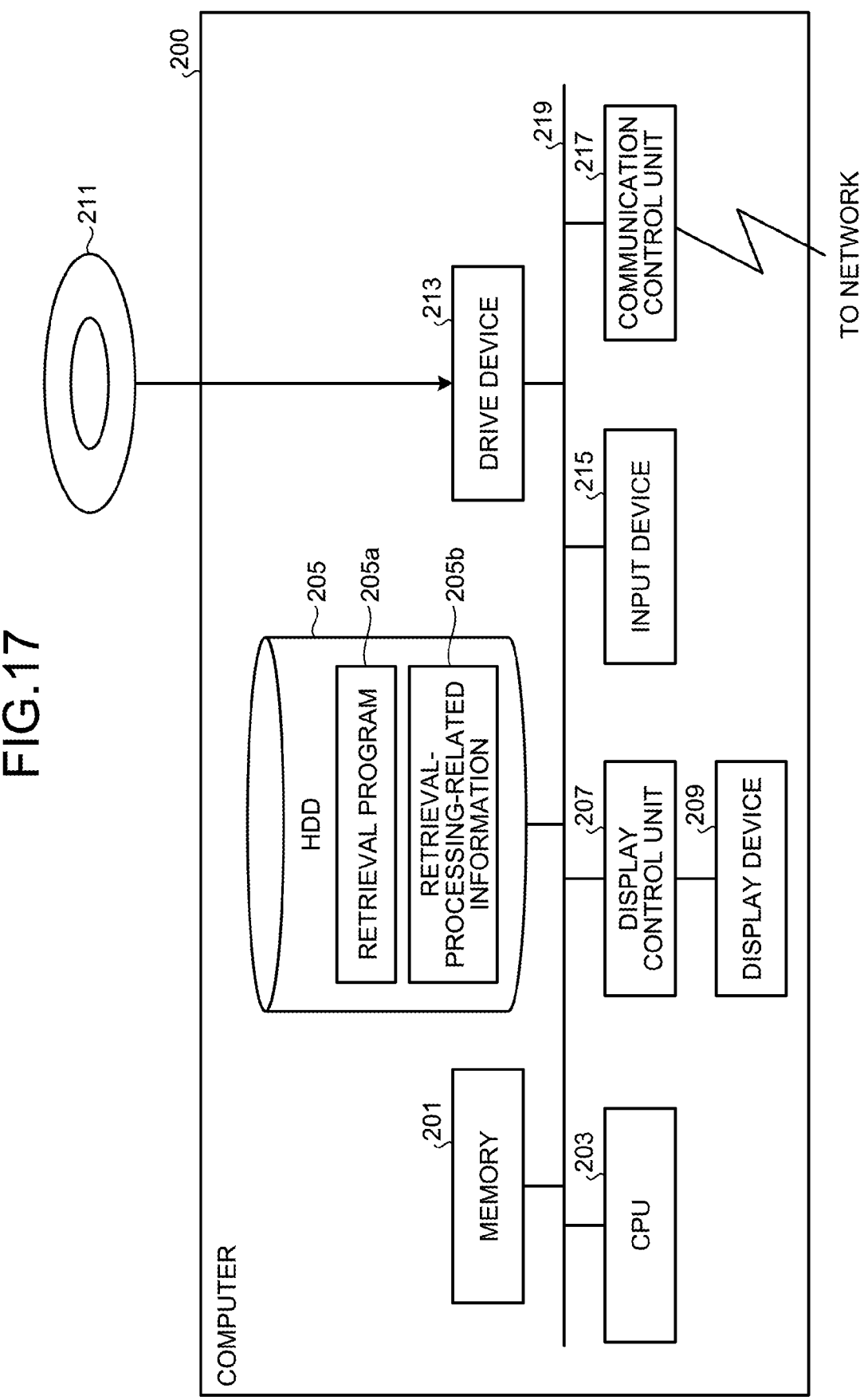
FIG. 17 depicts one example of a computer that executes retrieval program.

Moreover, the respective processing explained in the above embodiment can be implemented by executing a program that has been prepared in advance by a computer such as a personal computer and a workstation. Therefore, in the following, one example of a computer that executes a retrieval program implementing functions similar to those of the information processing apparatus 1 depicted in FIG. 1 is explained. FIG. 17 depicts one example of a computer that executes the retrieval program.

As depicted in FIG. 17, a computer 200 includes a CPU 203 that performs various kinds of arithmetic processing, an input device 215 that accepts an input of data from a user, and a display control unit 207 that controls a display device 209. Furthermore, the computer 200 includes a drive device 213 that reads a program and the like from a storage medium, and a communication control unit 217 that communicates data with other computers through a network. Moreover, the computer 200 includes a memory 201 that temporarily stores various kinds of data, and a hard disk drive (HDD) 205. The memory 201, the CPU 203, the HDD 205, the display control unit 207, the drive device 213, the input device 215, and the communication control unit 217 are connected through a bus 219.

The drive device 213 is, for example, a device for a removable disk 211. The HDD 205 stores a retrieval program 205a and retrieval-processing-related information 205b.

The CPU 203 reads the retrieval program 205a, and develops in the memory 201 to execute it as a process. The process corresponds to the respective functional units of the information processing apparatus 1. The retrieval-processing-related information 205b corresponds, for example, to the synonym dictionary 21, the search target document 22, the semantic structure 23, the first feature vector 24, the second feature vector 25, the weight vector 26, the determination result 27, and the search word 28. For example, the removable disk 211 stores the various kinds of data such as the retrieval program 205a.

The retrieval program 205a is not needed to be stored in the HDD 205 from the beginning. For example, the program can be stored in a "portable physical medium", such as a flexible disk (FD), a compact-disc read-only memory (CD-ROM), a digital versatile disk (DVD), a magneto-optical disk, or an integrated circuit (IC) card, that is inserted into the computer 200, and the computer 200 can read the retrieval program 205a from these to execute it.

According to one embodiment, noises included in a retrieval result can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a retrieval program that causes a computer to execute:
   receiving search text;
   generating a semantic structure of the search text indicating a meaning of a word that is included in the received search text, by subjecting the received search text to semantic analysis;
   generating a first feature vector by using the generated semantic structure of the search text and a synonym dictionary in which synonyms are stored in advance;
   evaluating the generated first feature vector by machine learning, and deriving a weight vector as a learning result;
   generating a search word based on a determination result of the machine learning;
   generating a second feature vector by using the generated search word and a search target document;
   evaluating the generated second feature vector by the machine learning; and
   outputting retrieval target text corresponding to the search text based on the determination result of the machine learning.

2. The non-transitory computer-readable recording medium according to claim 1, further comprising identifying, when determining that the identified word is included in the search target document, a word that is associated with the generated semantic structure of the search text by referring to a storage that stores a plurality of words included in the search target document associated with the semantic structure of the search text that indicates a meaning of the respective words;
   determining in which one of text in the search target document the identified word is included; and
   outputting information according to the determination result.

3. The non-transitory computer-readable recording medium according to claim 2, wherein
   the identifying by referring to the storage includes identifying, by referring to the storage, the semantic structure of the search text that indicates a meaning associated with a word that matches with the identified word, and identifying a word that is associated with the generated semantic structure of the search text by using the identified semantic structure of the search text and the generated information.

4. The non-transitory computer-readable recording medium according to claim 1, wherein
   the semantic structure of the search text indicating a meaning includes information that indicates a relationship between a word and another word included in the determination result.

5. The non-transitory computer-readable recording medium according to claim 4, wherein
   the generating the search word includes extracting the semantic structure of the search text that indicates a relationship between the word included in the determination result and another word directly related to the word, from the semantic structure of the search text indicating a meaning of the received search text, and generating the semantic structure of the search text indicating a meaning of the word with the extracted information.

6. A retrieval device that retrieves specific text from search target document, comprising:
   a processor that executes a process comprising:
   receiving search text;
   generating a semantic structure of the search text indicating a meaning of a word that is included in the received search text, by subjecting the received search text to semantic analysis;
   generating a first feature vector by using the generated semantic structure of the search text and a synonym dictionary in which synonyms are stored in advance;
   evaluating the generated first feature vector by machine learning, and deriving a weight vector as a learning result;

generating a search word based on a determination result of the machine learning;

generating a second feature vector by using the generated search word and a search target document;

evaluating the generated second feature vector by the machine learning; and outputting retrieval target text corresponding to the search text based on the determination result of the machine learning.

7. A retrieval method to be performed by a computer, the retrieval method comprising:

receiving search text;

generating a semantic structure of the search text indicating a meaning of a word that is included in the received search text, by subjecting the received search text to semantic analysis using a processor;

generating a first feature vector by using the generated semantic structure of the search text and a synonym dictionary in which synonyms are stored in advance using the processor;

evaluating the generated first feature vector by machine learning, and deriving a weight vector as a learning result using the processor;

generating a search word based on a determination result of the machine learning using the processor;

generating a second feature vector by using the generated search word and a search target document using the processor;

evaluating the generated second feature vector by the machine learning using the processor; and outputting retrieval target text corresponding to the search text based on the determination result of the machine learning using the processor.

8. The non-transitory computer-readable recording medium according to claim 1, the retrieval program further causing a computer to execute:

identifying a synonym of the word based on an output of a machine learning unit with input of the first feature vector, the machine learning unit performed machine learning using a feature vector generated from a supervising positive example and a feature vector generated from a supervising negative example in advance, wherein the feature vector generated from the supervising positive example is generated from two words being synonyms, the feature vector generated from the supervising negative example is generated from two words not being synonyms, the generating the second feature vector generates the second feature vector using the search word and words included in the search target document, the search word including the word and the identified synonym, and the outputting determines whether the search word and words included in the search target document are synonyms based on output of the machine learning unit with input of the second feature vector, and outputs the search target document that includes the determined synonym as a retrieval result.

\* \* \* \* \*